(12) United States Patent
Ozaki

(10) Patent No.: US 8,111,471 B2
(45) Date of Patent: Feb. 7, 2012

(54) IMAGING LENS, IMAGING DEVICE, AND PORTABLE TERMINAL

(75) Inventor: Yuichi Ozaki, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 13/125,658

(22) PCT Filed: Aug. 28, 2009

(86) PCT No.: PCT/JP2009/065059
§ 371 (c)(1),
(2), (4) Date: Apr. 22, 2011

(87) PCT Pub. No.: WO2010/047178
PCT Pub. Date: Apr. 29, 2010

(65) Prior Publication Data
US 2011/0194014 A1 Aug. 11, 2011

(30) Foreign Application Priority Data
Oct. 24, 2008 (JP) .................................. 2008-274187

(51) Int. Cl.
*G02B 9/00* (2006.01)
(52) U.S. Cl. ........ 359/754; 359/716; 359/737; 359/784; 359/791

(58) Field of Classification Search ............ 359/716, 359/737, 754, 784, 791
See application file for complete search history.

(56) References Cited

U.S. PATENT DOCUMENTS

2010/0165485 A1* 7/2010 Do .............................. 359/716
2010/0321794 A1* 12/2010 Hirao et al. ................. 359/716

FOREIGN PATENT DOCUMENTS

| JP | 2006-301403 | 11/2006 |
| JP | 4022246 | 10/2007 |
| JP | 2008-216807 | 9/2008 |
| JP | 2008-217039 | 9/2008 |
| JP | 2008-287007 | 11/2008 |

* cited by examiner

*Primary Examiner* — Evelyn A. Lester
(74) *Attorney, Agent, or Firm* — Cozen O'Connor

(57) ABSTRACT

The imaging lens includes, in order from the object side, a first lens having positive refractive power, a second lens having positive refractive power, and a third lens having negative refractive power. The first lens is provided with a substrate portion which is a parallel plate, and a lens portion formed of a material having a refractive index different from that of the substrate portion on at least one of the object-side surface or the image-side surface of the substrate portion, and the second lens is a single lens and satisfies the following conditional expression: $1 < f2/f < 20$, wherein f2 represents the focal length of the second lens and f represents the focal length of the entire imaging lens system.

10 Claims, 22 Drawing Sheets

FIG. 6
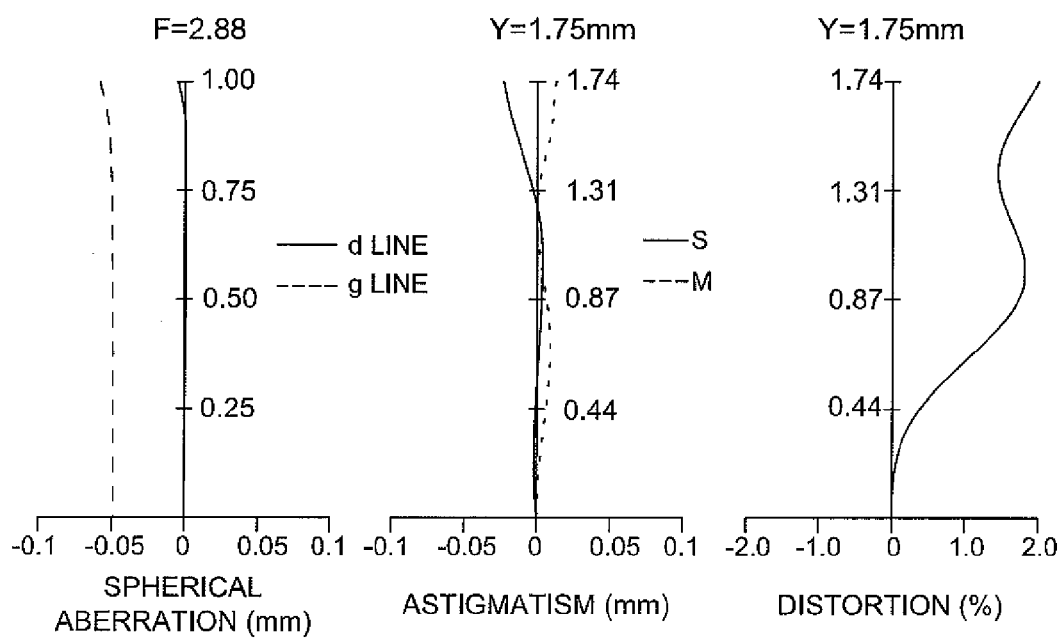
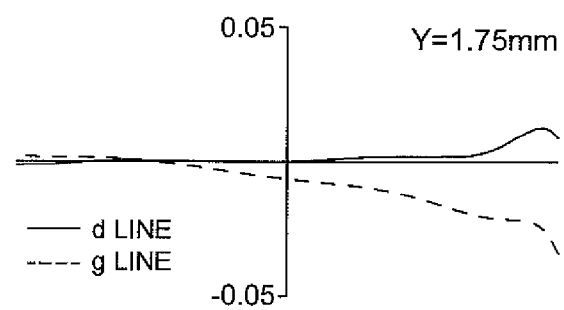
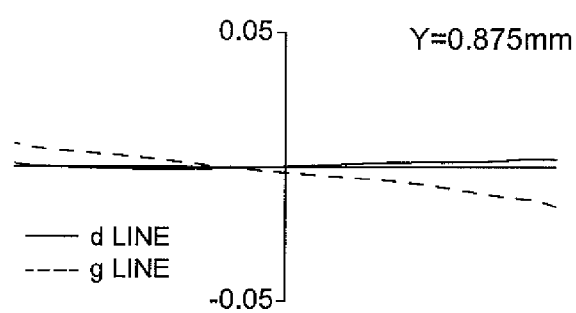
MERIDIONAL COMA
ABERRATION

FIG. 8
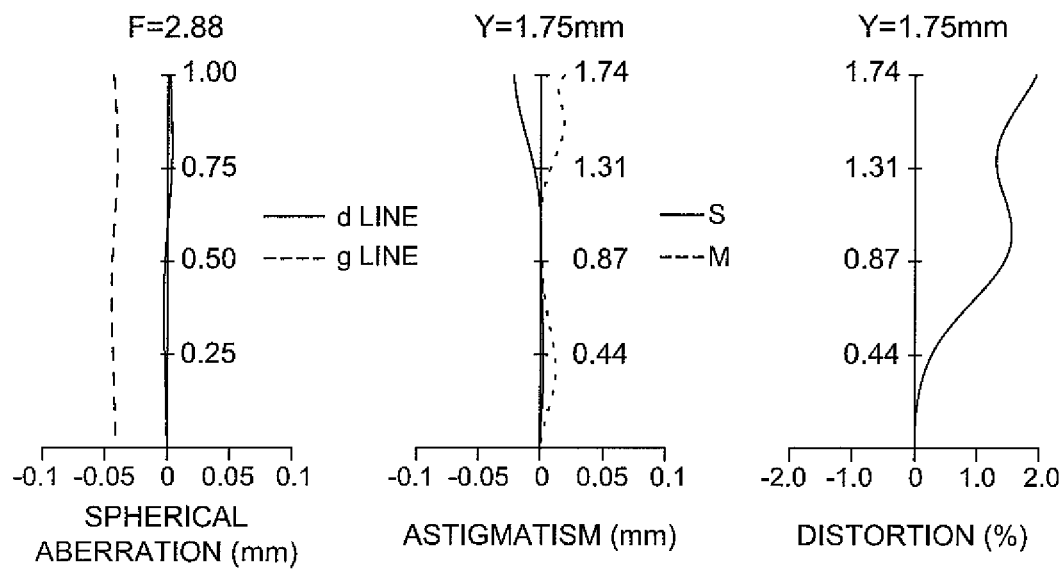
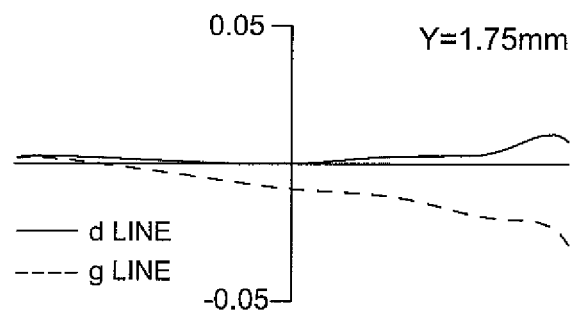
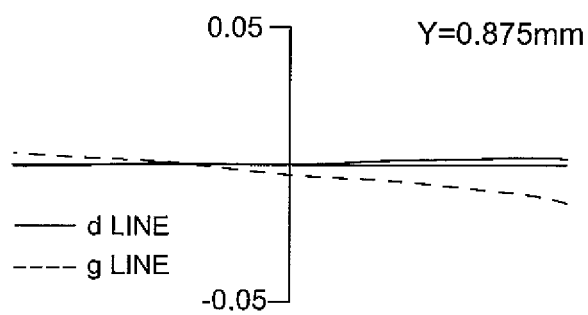
MERIDIONAL COMA
ABERRATION

IMAGING LENS, IMAGING DEVICE, AND PORTABLE TERMINAL

RELATED APPLICATIONS

This application is a U.S. National Phase Application under 35 USC 371 of International Application PCT/JP20091065059 filed Aug. 28, 2009.

This application claims the priority of Japanese application No. 2008-274187 filed Oct. 24, 2008, the entire content of which is hereby incorporated by reference.

TECHNICAL FIELD

The present invention relates to an imaging lens of an imaging device using a solid-state imaging element such as a CCD (Charge Coupled Device)-type image sensor or a CMOS (Complementary Metal-Oxide Semiconductor)-type image sensor, an imaging device, and a portable terminal.

BACKGROUND

Compact and extremely thin imaging devices are being used for compact and thin electronic devices such as mobile phones and PDAs (Persona Digital Assistants). As image sensors used in these imaging devices, solid-state imaging elements such as CCD-type image sensors and CMOS-type image sensors are known. Over recent years, the increase of pixels in imaging elements is in progress, and resolution and performance have been enhanced. Further, in imaging lenses to form an object image on these imaging elements, in response to miniaturization of imaging elements, compactness is being required and this requirement tends to grow year by year.

As such an imaging lens used for an imaging device (hereinafter referred to also as a "camera module") fitted into a portable terminal, a 3 plastic lens structure type and a 3 lens structure optical system of one glass lens and 2 plastic lenses are known (for example, refer to Patent document 1).

On the other hand, a method is proposed in which on a glass substrate of several inches, a large number of lens elements are simultaneously molded by a replica method and then the glass substrate (lens wafer) on which a large number of these lens elements have been formed is separated to mass-produce lenses. Lenses produced by such a production method are referred to also as wafer scale lenses. Three lens structure imaging lenses employing such wafer scale lenses are known (for example, refer to Patent Document 2 and Patent Document 3).

PRIOR ART DOCUMENTS

Patent Documents

Patent Document 1: Unexamined Japanese Patent Application Publication No. 2006-301403
Patent Document 2: Japanese Patent No. 3976782
Patent Document 3: Japanese Patent No. 4022246

DESCRIPTION OF THE INVENTION

Problems to be Solved by the Invention

When a lens is produced by molding a resin lens element on the above glass substrate, in view of processability and cost, glass (hereinafter referred to as a substrate section) on which a lens element is formed is preferably a parallel plate. However, in the case of such a parallel plate, one face of a lens element (hereinafter referred to as a lens section) to be brought into close contact has no refractive power, namely, only one side of the lens section can be allowed to have such power. Therefore, to realize enhanced refractive power without changing the effective diameter of the lens, the curvature radium of the face of the lens section making contact with air needs to decrease. However, a problem is produced in which as the curvature radius decreases, the difference in thickness between the peripheral portion and the central portion of the lens section increases, resulting in the difficulty in lens section molding.

Further, when production is carried out by the above replica method, a die is fixed on a substrate section and a UV curable resin is injected into a cavity, followed by curing of the UV curable resin by irradiation of UV radiation from the outside to easily form an aspheric lens section. In this method, there is produced the problem that unless the thickness of the resin section is allowed to be extremely small, transmission of UV radiation becomes worse and then a UV curable resin is hard to cure.

In contrast, it is also proposed that a die is fixed on a substrate section and a thermally curable resin is injected into a cavity, followed by heating of the die for curing of the thermally curable resin to form a lens section. However, in this case, the thermally curable resin is cured in the order from the face making contact with the die. Therefore, when the lens section is allowed to be thicker, curing of the portion distant from the die is delayed, resulting in the possibility of non-uniform refractive index.

In this manner, in cases in which for the lens section, an energy curable material such as a UV curable resin or a thermally curable resin is used, due to the fact that energy is transferred from the outside of the lens section toward the interior, as the lens section becomes thick, the problems that no curing is carried out into the interior and non-uniform material characteristics after curing are expressed may increase. Therefore, in either case, in a shape in which the thickness of the lens section is large, inappropriate characteristics result, whereby the problem that due to this matter, the curvature radius of the lens section is limited is produced.

On the other hand, in a 3 lens structure optical system, in order to realize total length reduction with correction of various aberrations, as described in above Patent Document 1, suitable is a so-called telephoto-type lens structure constituted, in the order from the object side, of a first lens of a meniscus shape having positive refractive power and a convex surface facing the object side; a second lens of a meniscus shape having positive refractive power and a convex surface facing the image side; and a third lens having negative refractive power.

However, to allow the second lens to have positive refractive power, the convex surface of the image side needs to have strong curvature. However, since the limitation of the curvature radius of the lens section as described above exists, it has been difficult to allow the second lens to have positive refractive power.

Therefore, the 3 lens structure optical system as described in Patent Document 2 and Patent Document 3 is formed into a so-called triplet type constituted of a first lens having positive refractive power, a second lens having negative refractive power, and a third lens having positive refractive power, which has been unsuitable for total length reduction.

In view of these problems, the present invention was completed. An object thereof is to provide an imaging lens having no limitation of the curvature radius of a lens section with excellent mass productivity, reduced cost and size, and excellent performance although the lens section is a 3 lens structure optical system employing a wafer scale lens; an imaging device exhibiting reduced size and high performance employing the imaging lens; and a potable terminal.

Means to Solve the Problems

A imaging lens described in item 1 is an imaging lens focusing an object image on the photoelectric conversion section of a solid-state imaging element, having a feature in which in the order from the object side, a first lens having positive refractive power, a second lens having positive refractive power, and a third lens having negative refractive power are provided; the first lens is provided with a substrate section which is a parallel plate and a lens section formed of a material differing in refractive index from the substrate section at least on either of the object side surface and the image side surface of the substrate section; and the second lens is a single lens satisfying the following conditional expression:

$$1 < f2/f < 20 \tag{1}$$

wherein f2 represents the focal length of the second lens and f represents the focal length of the entire imaging lens system.

The fundamental constitution of the present invention to obtain a small-size imaging lens with well corrected aberration contains, in the order from the object side, a first lens having positive refractive power, a second lens having positive refractive power, and a third lens having negative refractive power. In the order from the object side, by combination of the first lens and the second lens, positive refractive power is formed and the third lens has negative refractive power, whereby a lens constitution of a so-called telephoto type and also a constitution advantageous to reduction of the imaging lens total length can be realized.

With regard to aberration correction, positive refractive power is shared by the first lens and the second lens, whereby occurrence of spherical aberration and coma aberration can be prevented.

Further, since as the first lens, a lens in which a lens section having positive or negative power is formed on one side or both sides of a substrate section which is a parallel plate is used, by separation after simultaneous molding of a first lens in large numbers by a replica method, the first lens can be mass-produced. Thereby, an imaging device into which the imaging lens of the present invention is fitted can be allowed to have the compatibility of cost reduction and mass productivity.

Further, since use of a single lens as the second lens makes it possible to eliminate the limitation of the thickness of a lens section, the second lens can be allowed to easily have positive refractive power and the entire imaging lens system can be formed into a telephoto-type lens structure, whereby the imaging lens total length can be reduced.

Conditional expression (1) specifies the focal length of the above second lens. When the upper limit of conditional expression (1) is satisfied, the second lens can have appropriate positive refractive index. Therefore, the positive refractive power is shared by the first lens and the second lens, and thereby spherical aberration and coma aberration can be appropriately corrected. On the other hand, when the lower limit of conditional expression (1) is satisfied, the refractive power of the second lens is not excessively increased and the principal point position in combination of the first lens and the second lens is prevented from shifting to the image side, whereby an increase in the imaging lens total length can be prevented.

Herein, following conditional expression (1') is more preferably satisfied.

$$3 < f2/f < 15 \tag{1'}$$

The imaging lens described in item 2 has a feature in which in the invention described in item 1, the second lens has a meniscus shape having a convex surface facing the image side and the following conditional expression is satisfied:

$$0.90 < r3/r4 < 2.40 \tag{2}$$

wherein r3 represents the paraxial curvature radius of the second lens object side surface and r4 represents the paraxial curvature radius of the second lens image side surface.

Conditional expression (2) specifies the paraxial curvature radius of the object side surface and the paraxial curvature radius of the image side surface of the second lens. When the upper limit of conditional expression (2) is satisfied, the second lens has a strong meniscus shape having a convex surface facing the image side and then peripheral light beams pass through locations distant from the optical axis, whereby a constitution is realized in which the chromatic aberration of magnification and distortion of the entire imaging lens system are easily corrected. On the other hand, when the lower limit of conditional expression (2) is satisfied, the negative refractive power of the object side surface is decreased and the positive refractive power of the image side surface is increased, whereby the second lens can be allowed to have positive refractive power.

Herein, following conditional expression (2') is more preferably satisfied.

$$0.90 < r3/r4 < 1.5 \tag{2'}$$

The imaging lens described in item 3 has a feature in which in the inventions described in item 1 and item 2, a lens section of the object side surface and a lens section of the image side surface of the first lens are formed of different materials; the lens section of the object side surface of the first lens is a plano-convex lens having a convex surface facing the object side and the lens section of the image side surface of the first lens is a plano-concave lens having a concave surface facing the image side; and the following conditional expression is satisfied:

$$10 < v1 - v2 < 70 \tag{3}$$

wherein v1 represents the Abbe number of d line of the lens section of the object side surface of the first lens and v2 represents the Abbe number of d line of the lens section of the image side surface of the first lens.

In general, in a so-called telephoto-type lens structure constituted of a first lens having positive refractive power, a second lens having positive refractive power, and a third lens having negative refractive power, since a lens having negative refractive power is only the third lens located closest to the image side, axial chromatic aberration is frequently corrected insufficiently. However, when a lens section of the object side surface of the first lens section has positive refractive power; a lens section of the image side surface of the first lens section has negative refractive power; and further conditional expression (3) is satisfied, a positive lens exhibiting small dispersion and a negative lens exhibiting large dispersion are combined and thereby the role of correction of chromatic aberration such as axial chromatic aberration and chromatic aberration of magnification can be taken to realize a higher performance imaging lens.

Herein, following conditional expression (3') is more preferably satisfied.

$$10 < v1 - v2 < 40 \tag{3'}$$

The imaging lens described in item 4 has a feature in which in the invention described in any of item 1-item 3, the second lens is made of an energy curable resin material.

As a method to mount imaging devices at reduced cost in large numbers, a technology is proposed in which recently, a substrate having been previously subjected to solder potting is subjected to reflow treatment (heating treatment) in the state where electronic part such as IC chips and an optical element remains placed, and then solder is melted to simultaneously mount the electronic parts and the optical element on the substrate. The second lens is constituted of an energy curable resin material and then reflow treatment can be carried out, whereby the mass productivity of an imaging device can be increased.

In this case, the energy curable resin material includes both a thermally curable resin material and a light curable resin material. For example, thermally curable resins such as each type of silicone resin KER series (produced by Shin-Etsu Chemical Co., Ltd.) and UV curable resins are usable.

Herein, a curable resin material in the second lens requires lens thickness. Therefore, the lens is specifically preferably constituted of a thermally curable resin material.

Further, when in a lens section constituted of a resin material, inorganic fine particles of at most 30 nm is dispersed, performance degradation and image point position variation can be reduced even when temperature is changed. In addition, with no light transmittance decrease, an imaging lens exhibiting excellent optical characteristics regardless of environment change can be provided.

Usually, when a transparent resin material is mixed with fine particles, light scattering is generated and then transmittance is decreased, whereby use as an optical material has been difficult. However, when the size of fine particles is allowed to be smaller than the wavelength of a transmitted light flux, scattering can be allowed not to substantially occur.

Further, compared with a glass material, a resin material has a disadvantage in which small refractive index is expressed. However, in cases in which a resin material serving as a base material is dispersed with inorganic particles featuring large refractive index, it has been made clear that refractive index can be enhanced. Specifically, a resin material serving as a base material is dispersed with inorganic particles of at most 30 nm, preferably at most 20 inn, more preferably at most 15 nm, whereby a material exhibiting any appropriate temperature dependence can be provided.

Still further, the refractive index of a resin material is decreased with temperature elevation. However, it is known that when a resin material serving as abase material is dispersed with inorganic particles in which with temperature elevation, refractive index is increased, the action to compensate these characteristics is mutually produced, whereby refractive index variation due to temperature change can be reduced. In contrast, it is known that when a resin material serving as a base material is dispersed with inorganic particles in which with temperature elevation, refractive index is decreased, refractive index variation dependent on temperature change can be increased. Specifically, a resin material serving as a base material is dispersed with inorganic particles of at most 30 nm, preferably at most 20 nm, more preferably at most 15 nm, whereby a material exhibiting any appropriate temperature dependence can be provided.

For example, an acrylic resin is dispersed with fine particles of aluminum oxide ($Al_2O_3$) or lithium niobate ($LiNbO_3$), whereby a resin material exhibiting large refractive index can be obtained and at the same time, temperature-dependent refractive index variation can be reduced.

Next, temperature-dependent refractive index variation A will now be described. The temperature-dependent refractive index variation A is represented by the following expression [mathematical expression 1] in which based on Lorentz-Lorenz Formula, refractive index n is differentiated with respect to temperature t.

$$\frac{dn}{dt} = \frac{(n^2+2)(n^2-1)}{6n}\left\{(-3\alpha) + \frac{1}{[R]}\frac{\partial [R]}{\partial t}\right\}$$ [mathematical expression 1]

α: linear expansion coefficient, [R]: molecular refraction

In the case of a resin material, generally, the contribution of term 2 is smaller than that of term 1 in this expression, being almost negligible. For example, in the case of a PMMA resin, its linear expansion coefficient α is $7\times10^{-5}$, and when this value is substituted into the expression, $dn/dt=-1.2\times10^{-4}$ [/° C.], which is nearly equal to a measured value.

Herein, fine particles, preferably inorganic fine particles are dispersed in a resin material, whereby the contribution of term 2 of the expression is substantially increased for compensation with the variation resulting from the linear expansion coefficient of term 1. Specifically, a conventional variation of about $-1.2\times10^{-4}$ is preferably reduced to less than $8\times10^{-5}$ as the absolute value.

Further, the contribution of term 2 is allowed to be larger, whereby temperature characteristics opposite to those of a resin material serving as a base material can also be provided. Namely, a material can be obtained in which with temperature elevation, refractive index is not decreased but is increased in an opposite manner. Still further, in the same manner as this, when absorbing water, the refractive index of a resin material is increased but a material exhibiting decreased refractive index in an opposite manner can be obtained.

Mixture ratio can be appropriately adjusted to control the rate of the temperature-dependent refractive index variation, and also a plurality of types of nano-sized inorganic particles can be blended and dispersed.

The imaging lens described in item 5 has a feature in which in the invention described in any of item 1-item 4, the above third lens is provided with a substrate section which is a parallel plate and a lens section formed at least on either of the object side surface and the image side surface of the substrate section.

In a third lens, a lens section having positive or negative power is formed on one side or both sides of a substrate section which is a parallel plate, whereby by separation after simultaneous molding of a third lens in large numbers by a replica method, the third lens can be mass-produced. Thereby, an imaging device into which the imaging lens of the present invention is fitted can be allowed to have the compatibility of cost reduction and mass productivity.

The imaging lens described in item 6 has a feature in which in the invention described in any of item 1-item 4, the above third lens is a single lens.

When a single lens is used for the third lens, the thickness limitation of the lens section being problematic can be eliminated. Thereby, the degree of freedom of the shape of the third lens is increased and then excellent aberration correction can be made.

The imaging lens described in item 7 has a feature in which in the invention described in any of item 1-item 6, the above substrate section is formed of a glass material and the above lens section is formed of a resin material.

Glass is smaller in heat expansion coefficient than a resin. Therefore, when a substrate section is constituted of a glass material, optical characteristics of an imaging lens can be maintained in high temperature ambience. Further, when a lens section is constituted of a resin material, compared with the case of use of glass, processing/molding properties can be enhanced and also cost reduction can be realized. The contact face of the lens section and air is more preferably allowed to be an aspherical shape, whereby refractive index difference can be maximized and then the aspherical effect can be utilized to a maximum extent. Thereby, occurrence of various aberrations can be prevented to a minimum extent and then high performance can be easily realized. As the bonding method of a substrate section and a lens section, either of direct adhesion of a resin to be formed into a lens section and an indirect adhesion method employing another resin (an adhesive) can be employed. From the viewpoint of further prevention of the adverse effect to optical performance and cost reduction with a simple structure, a resin to be formed into a lens section is specifically preferably allowed to adhere. The substrate section may also double as an optical low pass filter and an IR cur filter.

The imaging lens described in item 8 has a feature in which in the invention described in any of item 1-item 7, the above lens section is formed of an energy curable resin material.

When a lens section is constituted of an energy curable resin material, in a wafer-shaped substrate section, the lens section can be simultaneously cured using a die in large numbers by varies methods, whereby mass-productivity can be increased.

Herein, a curable resin material is specifically preferably constituted of a UV curable resin material. Constitution using such a UV curable resin makes it possible to reduce curing duration and improve mass-productivity.

The imaging device described in item 9 is provided with the imaging lens described in any of item 1-item 8 and a solid-state imaging element to convert an object image having been focused by the imaging lens into an electrical signal.

The mobile terminal described in item 10 is provided with the imaging device described in item 9.

Effects of the Invention

According to the present invention, there can be provided an imaging lens having no limiting conditions of the lens shape in a wafer scale lens and exhibiting excellent mass productivity, reduced cost and size, and excellent performance; an imaging device with reduced cost and size and high performance provided with the imaging lens; and a potable terminal.

BRIEF DESCRIPTION OF THE DRAWINGS

FIG. 6 is an aberration diagram (spherical aberration, astigmatism, distortion, and meridional coma aberration) of the imaging lens shown in Example 1;

FIG. 8 is an aberration diagram (spherical aberration, astigmatism, distortion, and meridional coma aberration) of the imaging lens shown in Example 2;

PREFERRED EMBODIMENT OF THE INVENTION

The present invention will now be detailed with reference to an embodiment that by no means limits the scope of the present invention.

Figure 1:
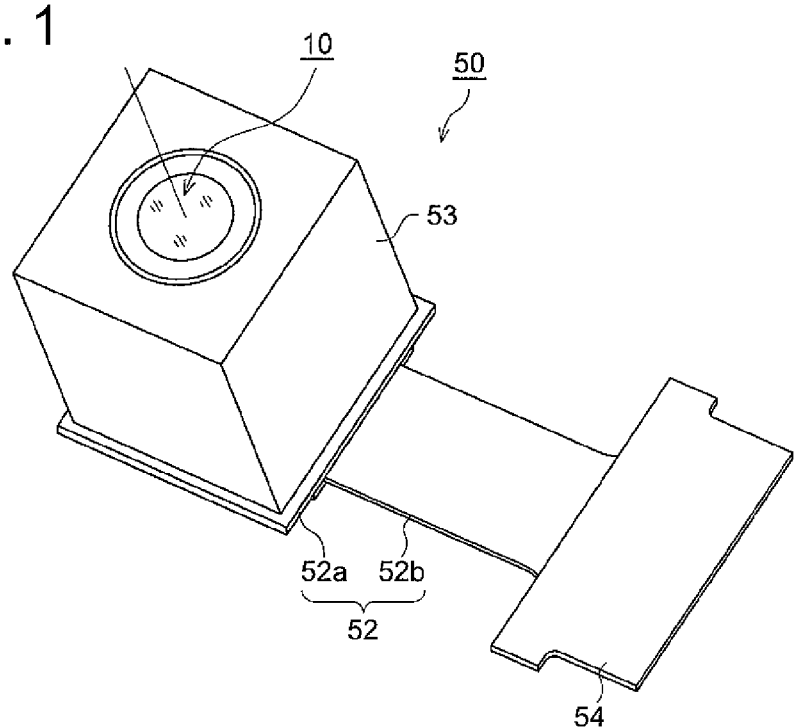
FIG. 1 is a perspective view of an imaging device according to the present embodiment.
Figure 2:
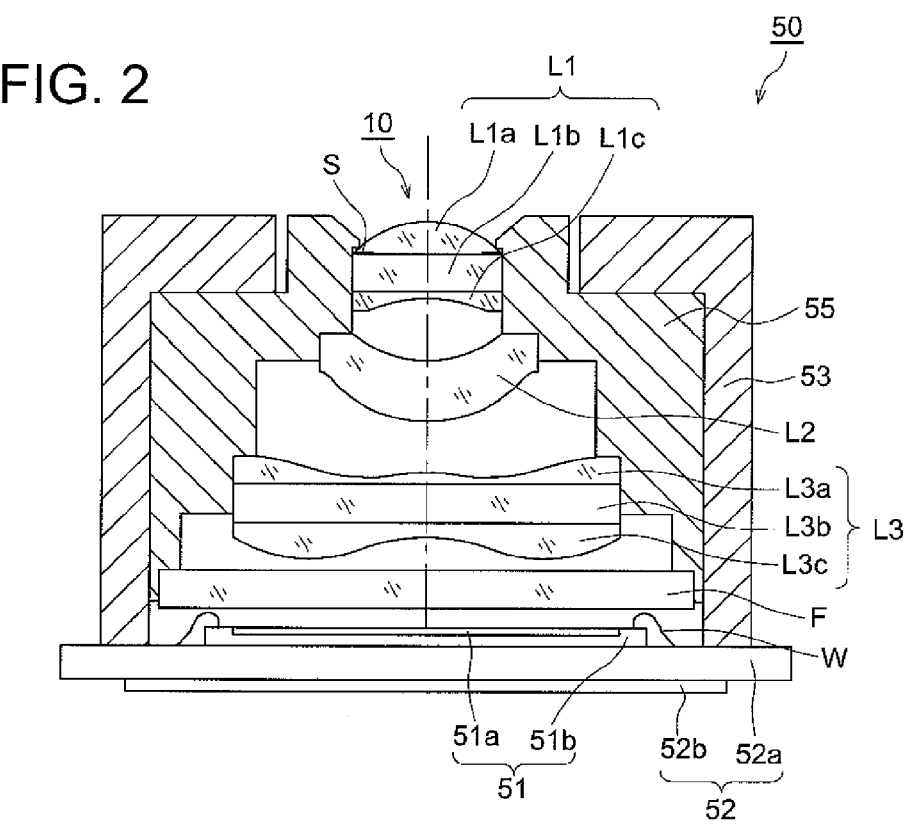
FIG. 2 is a view schematically showing the cross-section along the optical axis of the imaging lens of the imaging device according to the present embodiment

FIG. 1 is a perspective view of an imaging device 50 according to the present embodiment FIG. 2 is a view schematically showing the cross-section along the optical axis of the imaging lens of the imaging device 50 according to the present embodiment As shown in FIG. 1, the imaging device 50 is provided with an imaging lens 10 to focus an object image on the photoelectric conversion section of an imaging element, a housing 53 serving as a lens barrel made of a light shielding member, a support member 52a to hold an imaging element 51, and a flexible print substrate 52b having a terminal for external connection (referred to also as an external connection terminal) to transmit and receive an electrical signal of the imaging element, and these are integrally formed.

As shown in FIG. 2, in a CMOS-type imaging element 51, a photoelectric conversion section 51a serving as a light receiving section, in which in the central portion of the face on the light receiving side of the imaging element, pixels (photoelectric conversion elements) are two-dimensionally arranged, is formed, and in its periphery, a signal processing circuit 51b is formed. This signal processing circuit 51b is constituted of a drive circuit section to obtain a signal charge by sequentially driving each pixel, an A/D conversion section to convert each signal charge into a digital signal, and a signal processing section to form an image signal output using this digital signal.

In the outer edge periphery of the face on the light receiving side of the imaging element 51, a large number of pads, not shown, are provided, which are connected to a support substrate 52a via bonding wire W. The imaging element 51 converts a signal charge from the photoelectric conversion section 51a into a digital YUV signal for outputting to a predetermined circuit on the support substrate 52a via the bonding wire W. Herein, Y represents a luminance signal, U (=R−y) represents the color-difference signal of red and the luminance signal, and V (=B−Y) represents the color-difference signal of blue and the color difference signal.

Incidentally, the imaging element is not limited to the above CMOS-type image sensor but may be one applied with another sensor such as a CCD-type image sensor.

The substrate 52 is constituted of a hard support substrate 52a to support an imaging element 51 and a housing 53 using one side thereof and a flexible print substrate 52b one end portion of which is connected to the other face (the face of the side opposed to the imaging element 51) of the support substrate 52a. The support substrate 52a is provided with a large number of signal transmission pads on both the front side and the rear side. In one face, connection to the imaging element 51 is formed via the bonding wire W, and in the other face, connection to the flexible print substrate 52b is formed.

As shown in FIG. 1, one end portion of the flexible print substrate 52b is connected to the support substrate 52a and via an external connection terminal 54 provided for the other end portion, the support substrate 52a and an unshown external circuit (for example, a control circuit possessed by a higher-level device mounted with an imaging device) are connected, whereby a voltage to chive the imaging element 51 and a clock signal can be supplied from the external circuit and also a digital YUV signal can be output to the external circuit Further, the flexible print substrate 52b exhibits flexibility and the middle portion thereof deforms to provide the degree of freedom of orientation and arrangement of the external connection terminal 54 with respect to the support substrate 52a.

As shown in FIG. 2, the housing 53 is fixed and arranged so as to cover the imaging element 51 in the face of the imaging element 51 side of the support substrate 52a. Namely, the housing 53 is formed in such a manner that the housing is widely open on the imaging element 51 side so as to house the imaging element 51 and makes contact with the support substrate 52a to be fixed and the other end portion of the housing has a small opening.

In the interior of the housing 53, an IR cut filter F is fixed and arranged between the imaging lens 10 and the imaging element 51.

The imaging lens 10 has a first lens L1 having positive refractive power, a second lens L2 having positive refractive power, and a third lens L3 having negative refractive power.

As shown in the figure, the first lens L1 is constituted of a lens section L1a formed on the object side surface of a substrate section L1b which is a parallel plate and a lens section L1c formed on the image side surface. The second lens L2 is a single lens. The third lens L3 is constituted of a lens section L3a formed on the object side surface of a substrate lens L3b which is a parallel plate and a lens section L3c formed on the image side surface. The third lens L3 may be a single lens. Herein, in FIGS. 1 and 2, the paper plane upper side is designated as the object side and the paper plane lower side is designated as the image side.

The lenses L1-L3 constituting the imaging lens 10 each are held by a lens frame 55. The housing 53 encapsulates this lens frame 55 and the imaging element 10 held by the lens frame 55. The lens frame 55 is joined to the housing 53 in the periphery thereof and bumped up at the flange section having a small opening of the housing 53 for positioning.

Further, although not shown, between the lenses L1-L3 each and between the lens 3 and the IR cut filter F, a fixed aperture to cut unnecessary light is preferably arranged. A rectangular fixed aperture is arranged outside the light beam path, whereby ghost and flare can be prevented from occurring.

Figure 3:
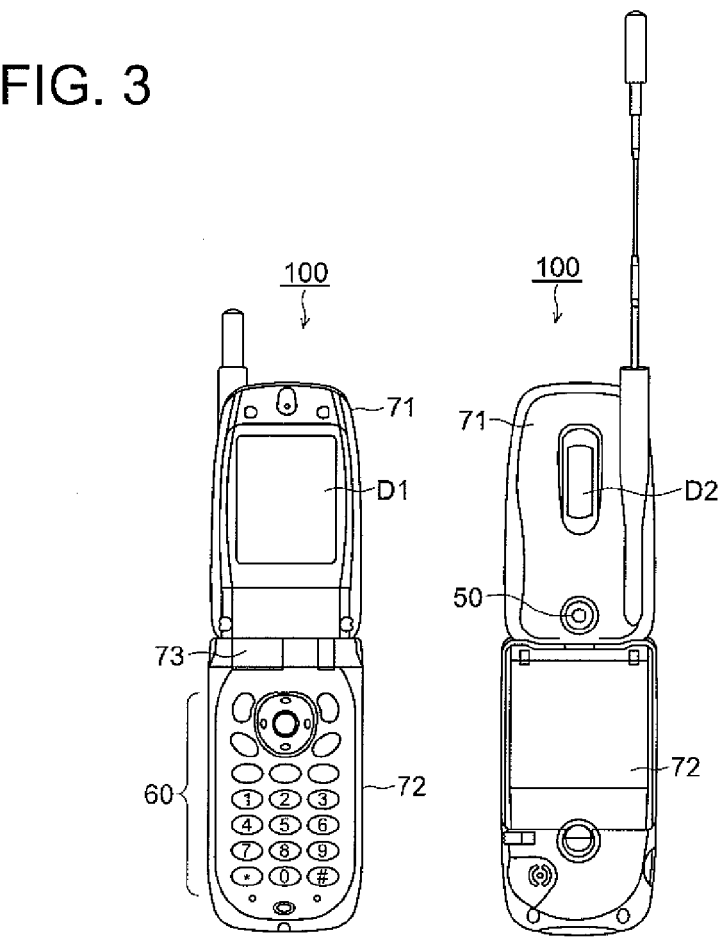
FIG. 3 is an external view of a mobile phone as one example of a mobile terminal provided with an imaging device according to the present embodiment.

FIG. 3 is an external view of a mobile phone 100 as one example of a mobile terminal provided with an imaging device 50 according to the present embodiment.

In the mobile phone 100 shown in the figure, an upper housing 71 serving as a case provided with display screens D1 and D2 and a lower housing 72 provided with an operation button 60 which is an input section are connected together via a hinge 73. The imaging device 50 is incorporated below the display screen D2 in the upper housing 71. The imaging device 50 is arranged to receive light from the external surface side of the upper housing 71.

Incidentally, this imaging device may be arranged above the display screen D2 in the upper housing 71 or on the side thereof. Further, of course, such a mobile phone is not limited to a flip one.

Figure 4:
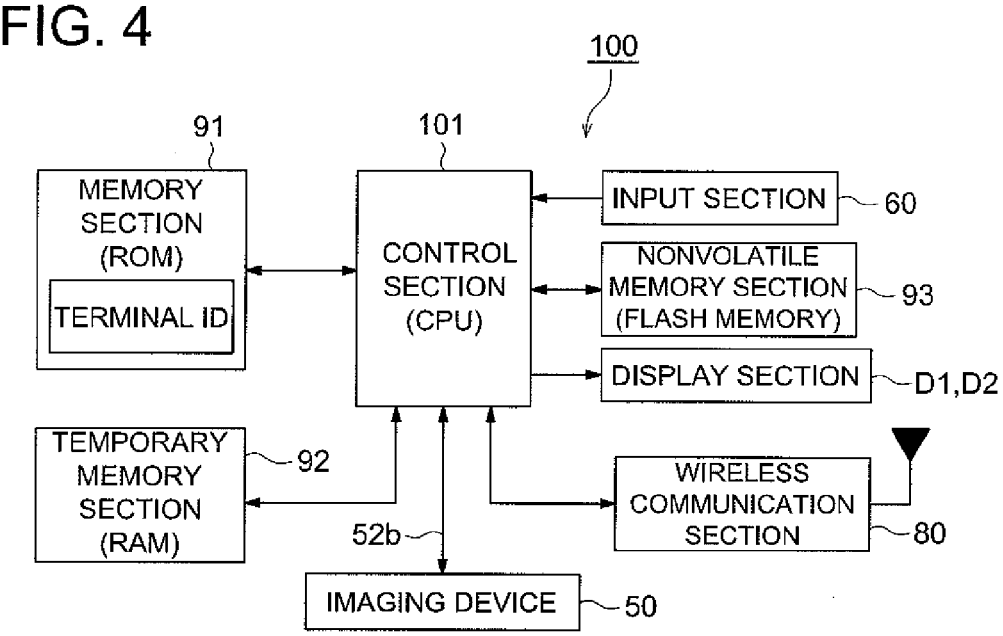
FIG. 4 is a diagram showing one example of the control block of a mobile phone.

FIG. 4 is a diagram showing one example of the control block of the mobile phone 100.

As shown in the figure, the imaging device 50 is connected to the control section 101 of the mobile phone 100 via a flexible print substrate 52b to output an image signal such as a luminance signal and a color-difference signal to the control section 101.

On the other hand, the mobile phone 100 is provided with a control section (CPU) 101 to control each section overall and also execute a program suitable for each processing an operation button 60 which is an input section to instruct and input numbers; display screens D1 and D2 to display predetermined data and a taken image; a wireless communication section 80 to realize various information communications between the phone and an external server; a memory section (ROM) 91 to memorize the system program of the mobile phone 100, various processing programs, and necessary date such as a terminal ID; and a temporary memory section (RAM) 92 to temporarily store various processing programs executed by the control section 101, data, processed data, and image data captured by the imaging device 50 and also to be used as an operation area.

Further, an image signal having been input from the imaging device 50 is, by the control section 101 of the mobile phone 100, memorized in a nonvolatile memory section (flash memory) 93, displayed in the display screens D1 and D2, and further transmitted to the exterior as image information via the wireless communication section 80. Herein, although not shown, the mobile phone 100 has a microphone and a speaker to input and output voices.

EXAMPLES

Preferred examples suitable for the embodiment described above will now be described. Herein, the present invention is not limited by the following examples. The meaning of each symbol is described below.

f: the focal length of the entire imaging lens system fB: back focus

F: F number

2Y: the imaging surface diagonal length of a solid-state imaging element (the diagonal length of the rectangular effective pixel area of a solid-state imaging element)

ENTP: entrance pupil position (the distance from the first surface to the entrance pupil)

EXTP: exit pupil position (the distance from the image plane to the exit pupil)

H1: front side principal point position (the distance from the first surface to the front side principal point)

H2: rear side principal point position (the distance from the final surface to the rear side principal point)

R: the curvature radius of a refractive surface

D: axial surface distance

Nd: the refractive index of d line of a lens material at ordinary temperature vd: the Abbe number of a lens material In each example, the shape of an aspherical surface is represented by following [mathematical expression 2] in which the top of the surface is designated as the origin, the X axis is set in the optical axis direction, and the height between the optical axis and a point in the vertical direction is designated as h.

$$X = \frac{h^2/R}{1 + \sqrt{1-(1+K)h^2/R^2}} + \sum A_i h^i \quad \text{[mathematical expression 2]}$$

wherein Ai represents the i-th aspherical surface coefficient, R represents the curvature radius, and K represents a conical constant.

Further, in the following description (including lens data of the tables), the power of 10 (for example, $2.5 \times 10^{-02}$) is represented using E (for example, 2.5E-02). Then, the surface numbers of the lens data were provided sequentially in which the object side of the first lens was designated as the first surface. Herein, all of the units of the numerical values representing the lengths described in the examples are designated as mm.

Example 1

The entire data of the imaging lenses of Example 1 is listed below.

f = 2.74 mm
fB = 0.17 mm
F = 2.88
2Y = 3.5 mm
ENTP = 0.18 mm
EXTP = −1.75 mm
H1 = −1.00 mm
H2 = −2.57 mm

Surface data of the imaging lens of Example 1 is listed below.

| Surface Number | R (mm) | D (mm) | Nd | vd | Effective Radius (mm) |
|---|---|---|---|---|---|
| 1* | 0.861 | 0.250 | 1.51400 | 58.1 | 0.51 |
| 2 (aperture) | ∞ | 0.300 | 1.64920 | 29.9 | 0.45 |
| 3 | ∞ | 0.050 | 1.51400 | 58.1 | 0.48 |
| 4* | 1.821 | 0.493 | | | 0.48 |
| 5* | −1.314 | 0.465 | 1.52640 | 53.8 | 0.59 |
| 6* | −1.344 | 0.406 | | | 0.80 |
| 7* | 1.542 | 0.083 | 1.51400 | 58.1 | 1.23 |
| 8 | ∞ | 0.300 | 1.47400 | 56.4 | 1.32 |
| 9 | ∞ | 0.127 | 1.51400 | 58.1 | 1.47 |
| 10* | 0.955 | 0.265 | | | 1.52 |
| 11 | ∞ | 0.300 | 1.51630 | 64.1 | 1.63 |
| 12 | ∞ | | | | 1.70 |

Aspherical coefficients are listed below.

First surface

K = 0.44870E+00, A4 = −0.31844E−01, A6 = −0.63134E−02,
A8 = −0.36913E+00, A10 = 0.61429E+00

Fourth surface

K = 0.88269E+01, A4 = 0.91256E−01, A6 = 0.25991E+00,
A8 = −0.15519E+01, A10 = 0.96274E+01

Fifth surface

K = 0.11098E+01, A4 = −0.48314E+00, A6 = −0.36282E+00,
A8 = −0.45625E−01, A10 = 0.25632E+01, A12 = −0.36783E+02,
A14 = 0.96597E+02

Sixth surface

K = 0.13715E+01, A4 = −0.50337E+00, A6 = 0.82425E+00,
A8 = −0.91265E+00, A10 = 0.15890E+00, A12 = 0.98458E+00,
A14 = 0.62717E+00

Seventh surface

K = −0.12236E+02, A4 = −0.54692E+00, A6 = 0.33789E+00,
A8 = −0.67237E−02, A10 = −0.50642E−01, A12 = 0.11970E−01

Tenth surface

K = −0.57937E+01, A4 = −0.19051E+00, A6 = 0.85532E−01,
A8 = −0.45603E−01, A10 = 0.16487E−01, A12 = −0.23766E−02

Single lens data of the imaging lens of Example 1 is listed below.

| Lens | Starting Surface | Focal Length (mm) |
|---|---|---|
| 1 | 1 | 2.640 |
| 2 | 5 | 25.617 |
| 3 | 7 | −6.966 |

In Example 1, all of the lens sections formed on the substrate sections are formed of the same resin material.

Figure 5:
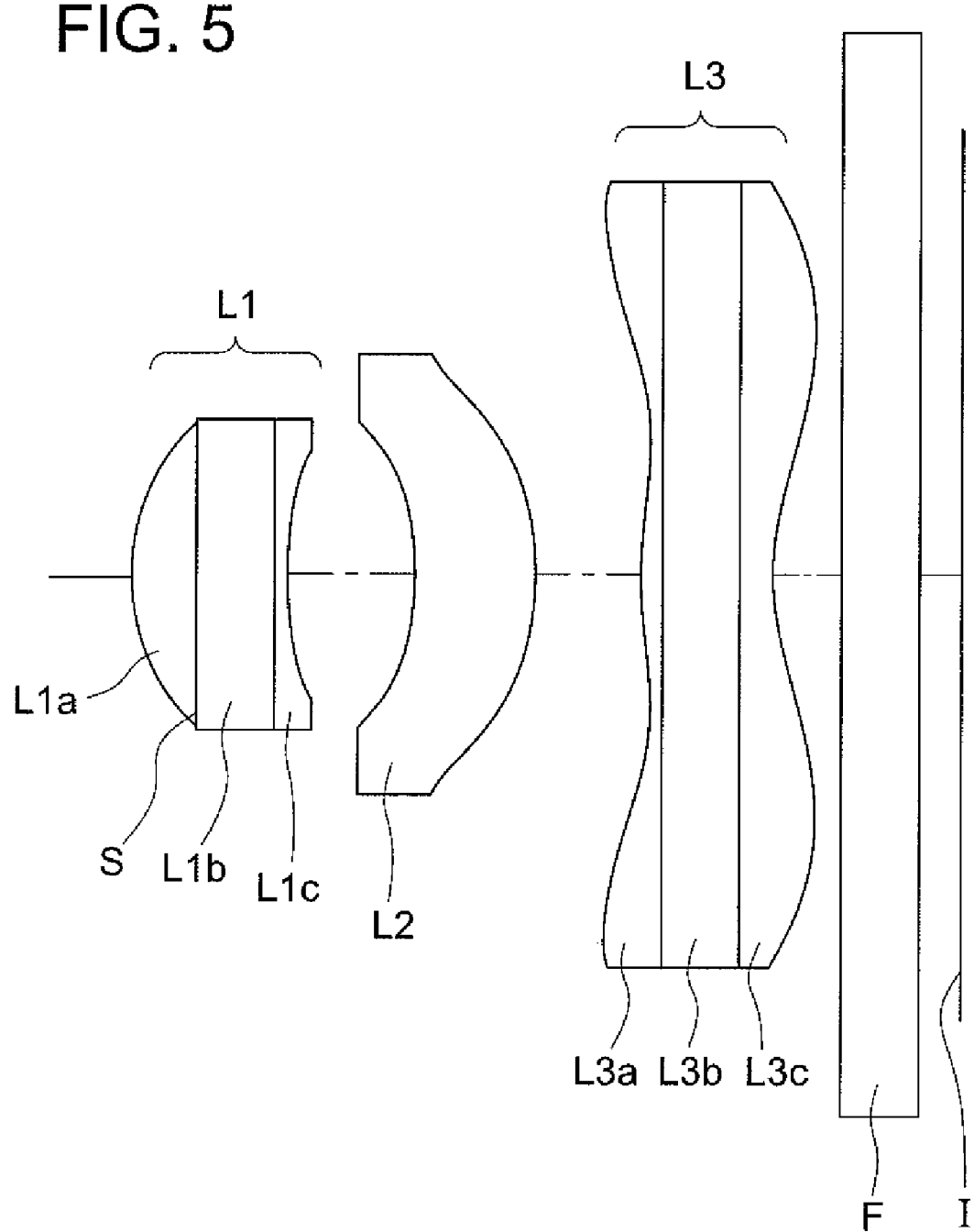
FIG. 5 is a sectional view of the imaging lens shown in Example 1.

FIG. 5 is a sectional view of the imaging lens shown in Example 1, which is constituted, in the order from the object side along the optical axis, of a first lens L1, a second lens L2, a third lens L3, an optical low pass filter, an IR cut filter, a parallel plate F in which a seal glass of a solid-state imaging element is assumed, and the imaging surface I of a solid-state imaging element. Further, the first lens L1 is a lens block which is constituted, in the order from the object side along the optical axis, of a lens section L1a of the object side, an aperture stop S, a substrate section L1b, and a lens section L1c of the image side. The second lens L2 is a single lens. The third lens L3 is a block lens which is constituted, in the order from the object side along the optical axis, of a lens section L3a of the object side, a substrate section L3b, and a lens section L3c of the image side.

In Example 1, the aperture stop S is bonded between the lens section L1a of the object side of the first lens and the substrate section L1b. Such a constitution makes it possible that no member to fix the aperture stop S is required, resulting in reduced cost.

FIG. 6 is an aberration diagram (spherical aberration, astigmatism, distortion, and meridional coma aberration) of the imaging lens shown in Example 1. Incidentally, in the following aberration diagrams, in the spherical aberration diagram and the meridional coma aberration diagram, a solid line represents d line and a dotted line represents g line. In the astigmatism diagram, a solid line represents the sagittal image plane and a dotted line represents the meridional image plane.

Example 2

The entire data of the imaging lenses of Example 2 is listed below.

f = 2.44 mm
fB = 0.20 mm
F = 2.88
2Y = 3.5 mm
ENTP = 0.15 mm
EXTP = −1.80 mm
H1 = −0.39 mm
H2 = −2.24 mm

Surface data of the imaging lens of Example 2 is listed below.

| Surface Number | R (mm) | D (mm) | Nd | vd | Effective Radius (mm) |
|---|---|---|---|---|---|
| 1* | 0.894 | 0.211 | 1.51400 | 58.1 | 0.46 |
| 2 (aperture) | ∞ | 0.300 | 1.64920 | 29.9 | 0.41 |
| 3 | ∞ | 0.050 | 1.51400 | 58.1 | 0.45 |
| 4* | 2.024 | 0.440 | | | 0.47 |
| 5* | −1.321 | 0.551 | 1.52640 | 53.8 | 0.58 |
| 6* | −1.437 | 0.262 | | | 0.82 |
| 7* | 1.011 | 0.193 | 1.51400 | 58.1 | 1.24 |
| 8 | ∞ | 0.300 | 1.47400 | 56.4 | 1.34 |
| 9 | ∞ | 0.052 | 1.51400 | 58.1 | 1.47 |
| 10* | 0.807 | 0.365 | | | 1.54 |
| 11 | ∞ | 0.200 | 1.51630 | 64.1 | 1.64 |
| 12 | ∞ | | | | 1.69 |

Aspherical coefficients are listed below.

First surface

K = 0.45017E+00, A4 = −0.30147E−01, A6 = −0.41257E+00,
A8 = 0.20135E+01, A10 = −0.30301E+01
Fourth surface K = 0.75842E+01, A4 = 0.16963E−01, A6 = 0.83981E+00,
A8 = 0.22278E+00, A10 = 0.80664E+01
Fifth surface K = 0.87857E+00, A4 = −0.30782E+00, A6 = −0.94141E+00,
A8 = 0.81061E+01, A10 = 0.37374E+01, A12 = −0.33952E+02,
A14 = 0.95374E+02
Sixth surface K = 0.16116E+01, A4 = −0.71400E+00, A6 = 0.11970E+01,
A8 = −0.11439E+01, A10 = −0.24877E+00, A12 = 0.89988E+00,
A14 = 0.10351E+01
Seventh surface K = −0.62062E+01, A4 = −0.55124E+00, A6 = 0.33117E+00,
A8 = −0.46084E−02, A10 = −0.50008E−01, A12 = 0.11666E−01

-continued

Tenth surface

K = −0.40471E+01, A4 = −0.21565E+00, A6 = 0.11138E−00,
A8 = −0.53388E−01, A10 = 0.16442E−01, A12 = −0.21473E−02

Single lens data of the imaging lens of Example 2 is listed below.

| Lens | Starting Surface | Focal Length (mm) |
|---|---|---|
| 1 | 1 | 2.683 |
| 2 | 5 | 48.308 |
| 3 | 7 | −100.000 |

In Example 2, all of the lens sections formed on the substrate sections are formed of the same resin material.

Figure 7:
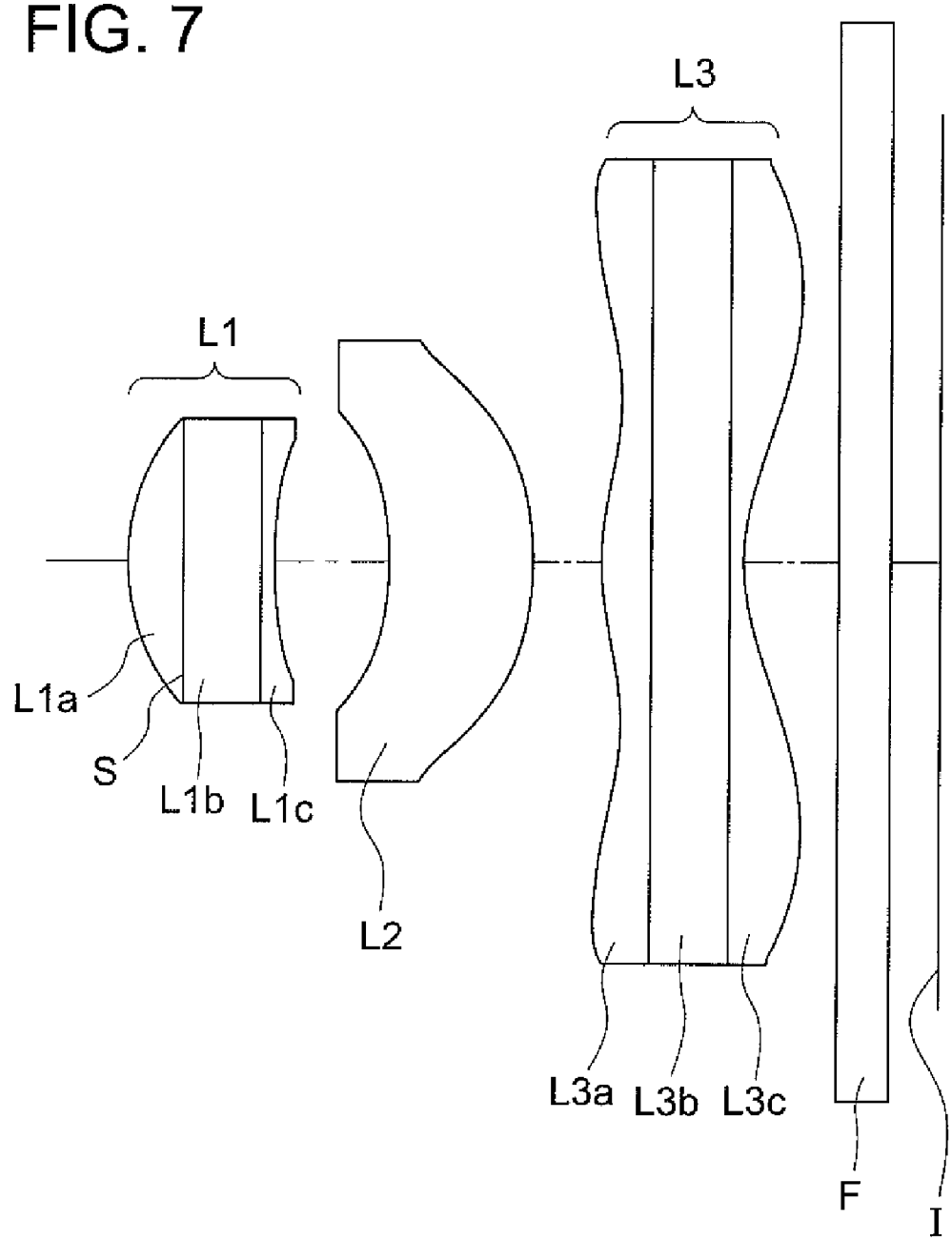
FIG. 7 is a sectional view of the imaging lens shown in Example 2.

FIG. 7 is a sectional view of the imaging lens shown in Example 2 which is constituted, in the order from the object side along the optical axis, of a first lens L1, a second lens L2, a third lens L3, an optical low pass filter, an IR cut filter, a parallel plate F in which a seal glass of a solid-state imaging element is assumed, and the imaging surface I of a solid-state imaging element. Further, the first lens L1 is a lens block which is constituted, in the order from the object side along the optical axis, of a lens section L1a of the object side, an aperture stop S, a substrate section L1b, and a lens section L1c of the image side. The second lens L2 is a single lens. The third lens L3 is a block lens which is constituted, in the order from the object side along the optical axis, of a lens section L3a of the object side, a substrate section L3b, and a lens section L3c of the image side.

FIG. 8 is an aberration diagram (spherical aberration, astigmatism, distortion, and meridional coma aberration) of the imaging lens shown in Example 2.

Example 3

The entire data of the imaging lenses of Example 3 is listed below.

f = 2.75 mm
fB = 0.13 mm
F = 2.88
2Y = 3.5 mm
ENTP = 0.18 mm
EXIT = −1.70 mm
H1 = −1.20 mm
H2 = −2.62 mm

Surface data of the imaging lens of Example 3 is listed below.

| Surface Number | R (mm) | D (mm) | Nd | vd | Effective Radius (mm) |
|---|---|---|---|---|---|
| 1* | 0.867 | 0.248 | 1.51400 | 58.1 | 0.51 |
| 2 (aperture) | ∞ | 0.300 | 1.64920 | 29.9 | 0.46 |
| 3 | ∞ | 0.050 | 1.51400 | 58.1 | 0.48 |
| 4* | 1.856 | 0.489 | | | 0.49 |
| 5* | −1.345 | 0.465 | 1.52640 | 53.8 | 0.59 |
| 6* | −1.316 | 0.449 | | | 0.79 |
| 7* | 1.723 | 0.071 | 1.54000 | 33.0 | 1.21 |
| 8 | ∞ | 0.300 | 1.47400 | 56.4 | 1.31 |
| 9 | ∞ | 0.145 | 1.54000 | 33.0 | 1.46 |
| 10* | 0.955 | 0.265 | | | 1.52 |
| 11 | ∞ | 0.300 | 1.51630 | 64.1 | 1.64 |
| 12 | | | | | 1.71 |

-continued

Aspherical coefficients are listed below.

First surface

K = 0.53060E+00, A4 = −0.33357E−01, A6 = −0.18963E+00,
A8 = 0.39189E+00, A10 = −0.98600E+00
Fourth surface K = 0.94031E+01, A4 = 0.81077E−01, A6 = 0.21547E+00,
A8 = −0.12419E+01, A10 = 0.79908E+01
Fifth surface K = 0.81318E+00, A4 = −0.50869E+00, A6 = −0.46199E+00,
A8 = −0.27616E+00, A10 = 0.43326E+01, A12 = −0.36006E+02,
A14 = 0.89605E+02
Sixth surface K = 0.13201E+01, A4 = −0.48294E+00, A6 = 0.77789E+00,
A8 = −0.94223E+00, A10 = 0.26206E+00, A12 = 0.10661E+01,
A14 = 0.66725E+00
Seventh surface K = −0.14333E+02, A4 = −0.57612E+00, A6 = 0.35740E+00,
A8 = −0.65375E−02, A10 = −0.54557E−01, A12 = 0.12860E−01
Tenth surface K = −0.60620E+01, A4 = −0.20236E+00, A6 = 0.94998E−01,
A8 = −0.49810E−01, A10 = 0.17780E−01, A12 = −0.25558E−02

Single lens data of the imaging lens of Example 3 is listed below.

| Lens | Starting Surface | Focal Length (mm) |
|---|---|---|
| 1 | 1 | 2.646 |
| 2 | 5 | 17.714 |
| 3 | 7 | −5.227 |

In Example 3, the lens section formed on the substrate section of the first lens and the lens section of the substrate section of the first lens are formed of different resin materials.

Figure 9:
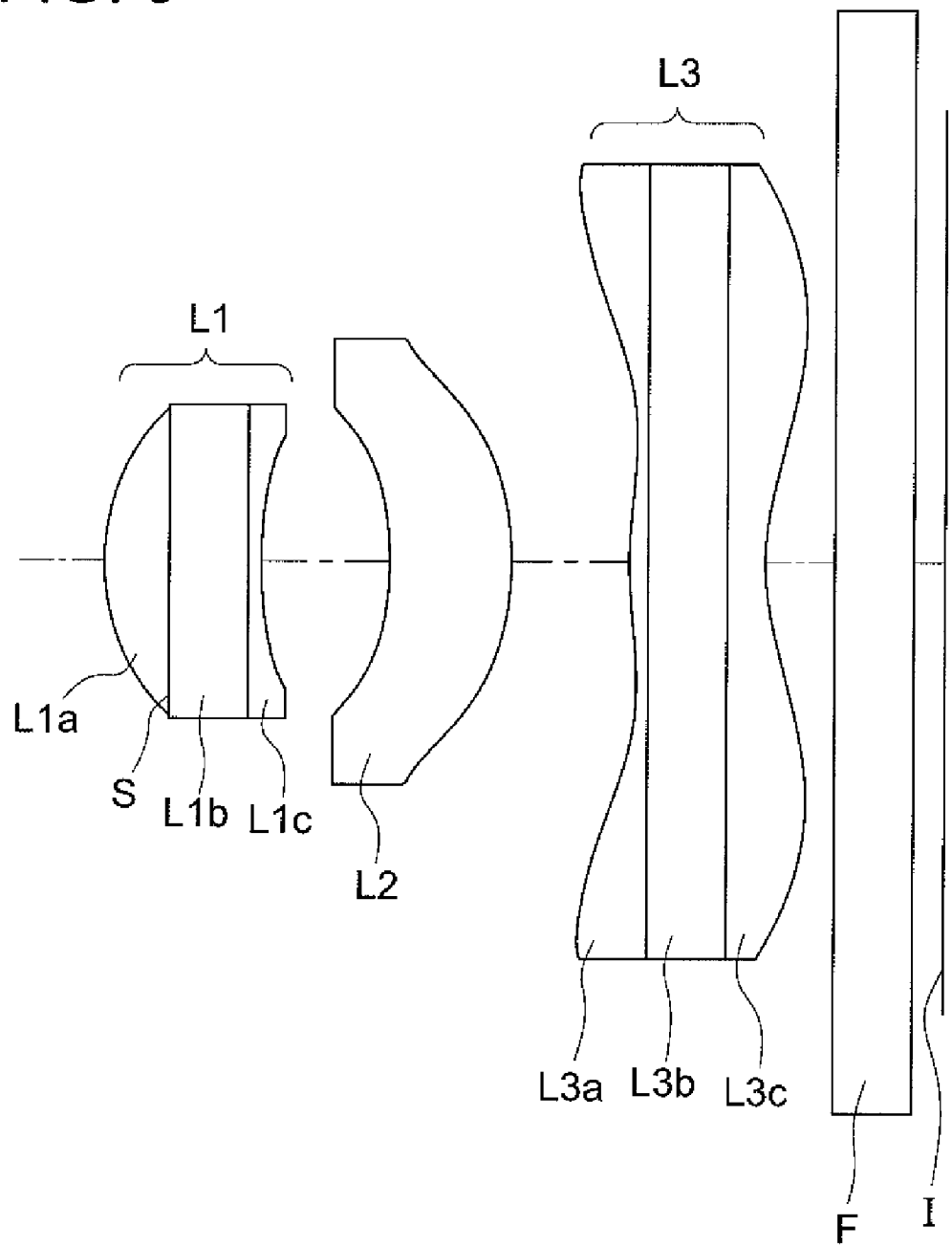
FIG. 9 is a sectional view of the imaging lens shown in Example 3.

FIG. 9 is a sectional view of the imaging lens shown in Example 3 which is constituted, in the order from the object side along the optical axis, of a first lens L1, a second lens L2, a third lens L3, an optical low pass filter, an IR cut filter, a parallel plate F in which a seal glass of a solid-state imaging element is assumed, and the imaging surfacer of a solid-state imaging element Further, the first lens L1 is a lens block which is constituted, in the order from the object side along the optical axis, of a lens section L1a of the object side, an aperture stop S, a substrate section L1b, and a lens section L1c of the image side. The second lens L2 is a single lens. The third lens L3 is a block lens which is constituted, in the order from the object side along the optical axis, of a lens section L3a of the object side, a substrate section L3b, and a lens section L3c of the image side.

Figure 10:
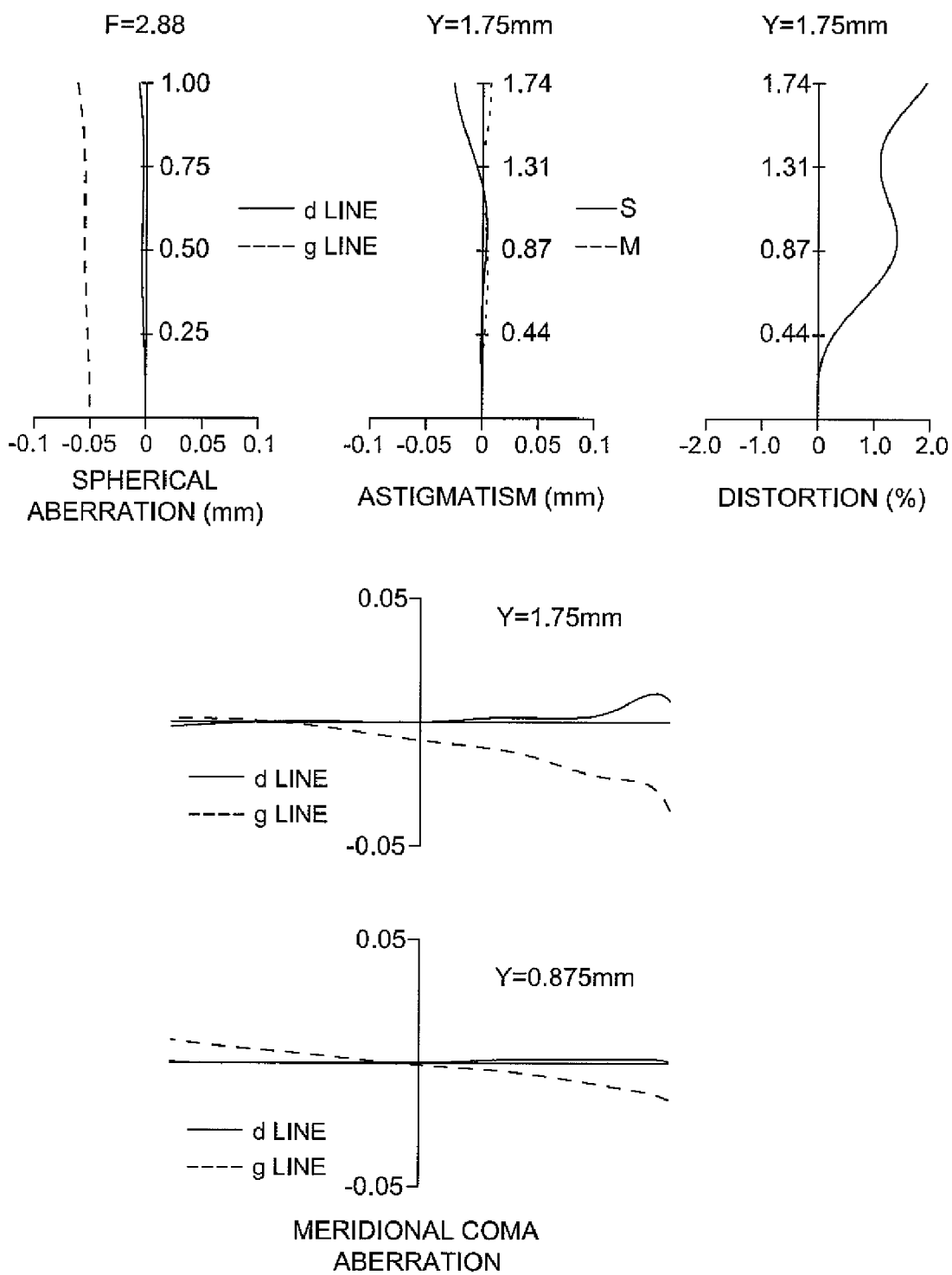
FIG. 10 is an aberration diagram (spherical aberration, astigmatism, distortion, and meridional coma aberration) of the imaging lens shown in Example 3.

FIG. 10 is an aberration diagram (spherical aberration, astigmatism, distortion, and meridional coma aberration) of the imaging lens shown in Example 3.

Example 4

The entire data of the imaging lenses of Example 4 is listed below.

f = 2.73 mm
fB = 0.21 m
F = 2.88
2Y = 3.5 mm
ENTP = 0.16 mm
EXTP = −1.75 mm
H1 = −0.90 mm
H2 = −2.52 mm

Surface data of the imaging lens of Example 4 is listed below.

| Surface Number | R (mm) | D (mm) | Nd | vd | Effective Radius (mm) |
|---|---|---|---|---|---|
| 1* | 0.863 | 0.227 | 1.51400 | 58.1 | 0.50 |
| 2 (aperture) | ∞ | 0.300 | 1.47400 | 56.4 | 0.46 |
| 3 | ∞ | 0.050 | 1.54000 | 33.0 | 0.48 |
| 4* | 1.829 | 0.492 | | | 0.49 |
| 5* | −1.423 | 0.462 | 1.52640 | 53.8 | 0.60 |
| 6* | −1.427 | 0.374 | | | 0.81 |
| 7* | 1.389 | 0.093 | 1.51400 | 58.1 | 1.22 |
| 8 | ∞ | 0.300 | 1.64920 | 29.9 | 1.32 |
| 9 | ∞ | 0.128 | 1.51400 | 58.1 | 1.44 |
| 10* | 0.925 | 0.265 | | | 1.50 |
| 11 | ∞ | 0.300 | 1.51630 | 64.1 | 1.60 |
| 12 | ∞ | | | | 1.68 |

Aspherical coefficients are listed below.

First surface

K = 0.45502E+00, A4 = −0.54218E−01, A6 = 0.15189E+00,
A8 = −0.10462E+01, A10 = 0.14234E+01
Fourth surface K = 0.88425E+01, A4 = 0.73120E−01, A6 = 0.37798E+00,
A8 = −0.18936E+01, A10 = 0.84286E+01
Fifth surface K = 0.12639E+01, A4 = −0.40123E+00, A6 = −0.46630E+00,
A8 = 0.13767E−01, A10 = 0.40622E+01, A12 = −0.34594E+02,
A14 = 0.75112E+02
Sixth surface K = 0.16071E+01, A4 = −0.50002E+00, A6 = 0.79076E+00,
A8 = −0.82493E+00, A10 = 0.97876E−01, A12 = 0.77650E+00,
A14 = 0.58826E+00
Seventh surface K = −0.92483E+01, A4 = −0.55329E+00, A6 = 0.32538E+00,
A8 = −0.30038E−02, A10 = −0.48565E−01, A12 = 0.11385E−01
Tenth surface K = −0.50854E+01, A4 = −0.21838E+00, A6 = 0.10910E+00,
A8 = −0.53425E−01, A10 = 0.15874E−01, A12 = −0.19058E−02

Single lens data of the imaging lens of Example 4 is listed below.

| Lens | Starting Surface | Focal Length (mm) |
|---|---|---|
| 1 | 1 | 2.717 |
| 2 | 5 | 24.797 |
| 3 | 7 | −8.464 |

In Example 4 the lens section formed on the object side and the lens section formed on the image side of the substrate of the first lens are formed of different resin materials.

Figure 11:
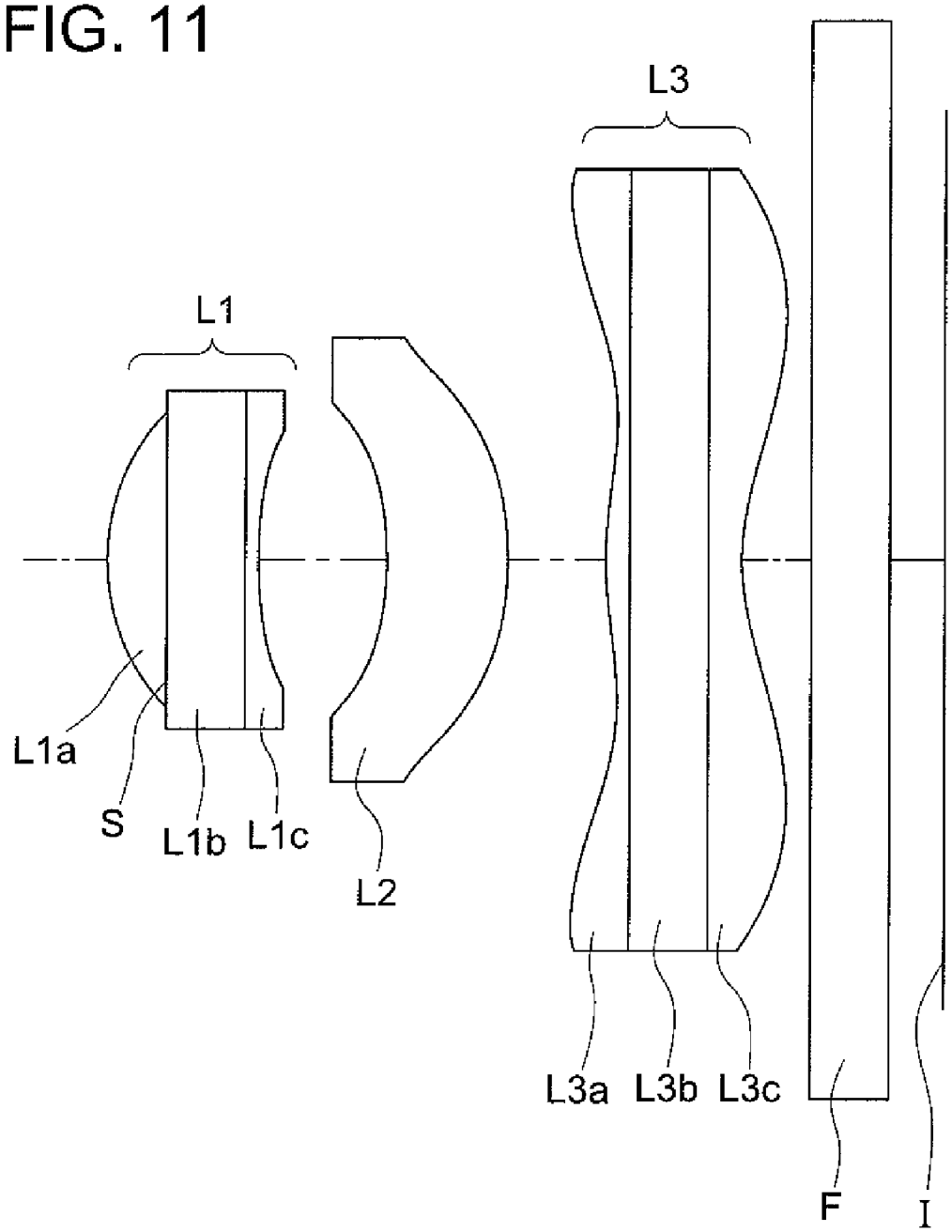
FIG. 11 is a sectional view of the imaging lens shown in Example 4.

FIG. 11, is a sectional view of the imaging lens shown in Example 4 which is constituted, in the order from the object side along the optical axis, of a first lens L1, a second lens L2, a third lens L3, an optical low pass filter, an IR cut filter, a parallel plate F in which a seal glass of a solid-state imaging element is assumed, and the imaging surface I of a solid-state imaging element. Further, the first lens L1 is a lens block which is constituted, in the order from the object side along the optical axis, of a lens section L1a of the object side, an aperture stop S, a substrate section L1b, and a lens section L1c of the image side. The second lens L2 is a single lens. The third lens L3 is a block lens which is constituted, in the order from the object side along the optical axis, of a lens section L1a of the object side, a substrate section L3b, and a lens section L3c of the image side.

Figure 12:
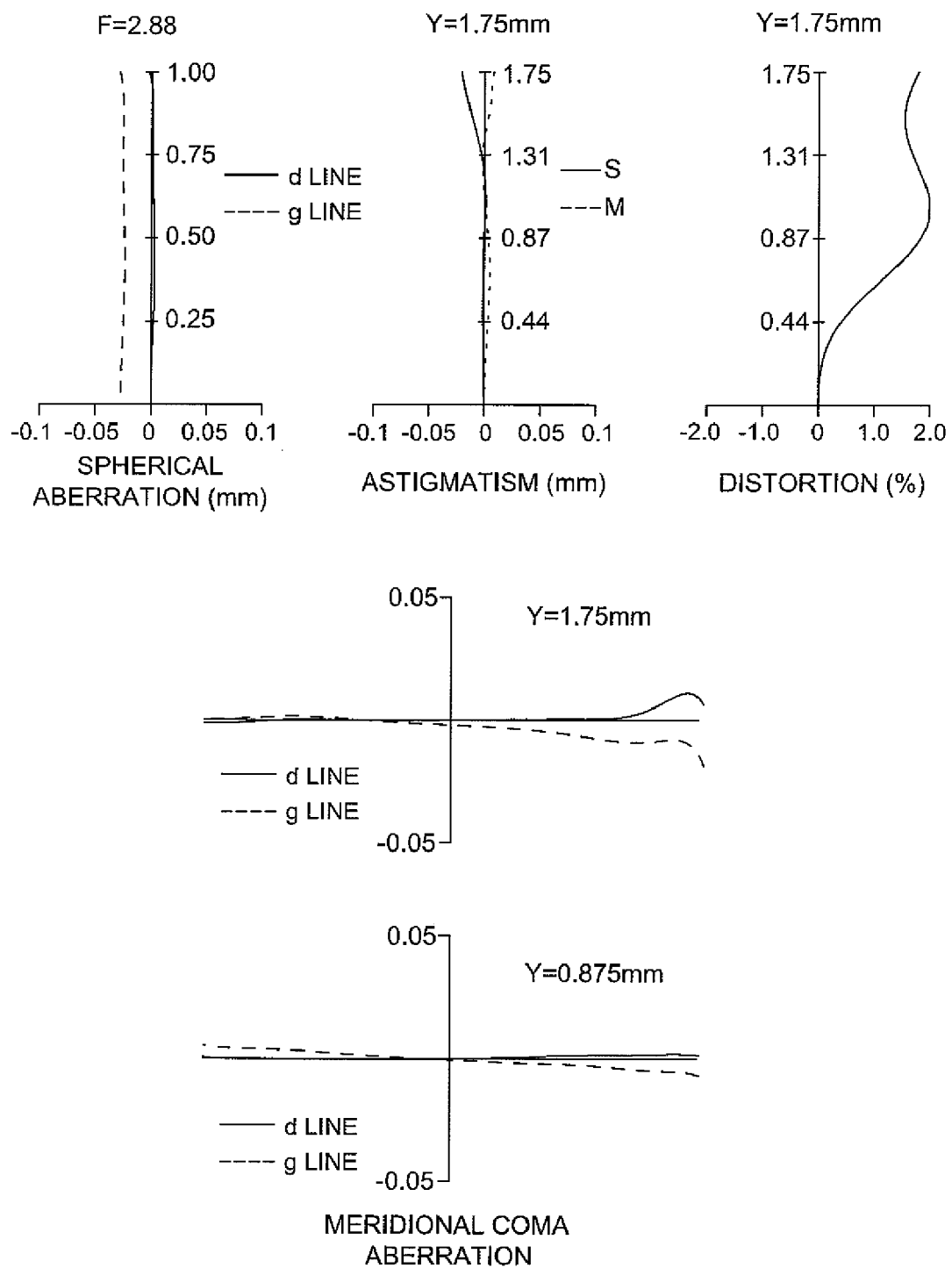
FIG. 12 is an aberration diagram (spherical aberration, astigmatism, distortion, and meridional coma aberration) of the imaging lens shown in Example 4.

FIG. 12 is an aberration diagram (spherical aberration, astigmatism, distortion, and meridional coma aberration) of the imaging lens shown in Example 4.

Example 5

The entire data of the imaging lenses of Example 5 is listed below.

f = 2.75 mm
fB = 0.16 m
F = 2.88
2Y = 3.5 mm
ENTP = 0.18 mm
EXTP = −1.73 mm
H1 = −1.07 mm
H2 = −2.59 mm

Surface data of the imaging lens of Example 5 is listed below.

| Surface Number | R (mm) | D (mm) | Nd | vd | Effective Radius (mm) |
|---|---|---|---|---|---|
| 1* | 0.863 | 0.248 | 1.51400 | 58.1 | 0.51 |
| 2 (aperture) | ∞ | 0.300 | 1.64920 | 29.9 | 0.45 |
| 3 | ∞ | 0.050 | 1.51400 | 58.1 | 0.47 |
| 4* | 1.834 | 0.487 | | | 0.48 |
| 5* | −1.335 | 0.469 | 1.52640 | 53.8 | 0.59 |
| 6* | −1.294 | 0.419 | | | 0.80 |
| 7* | 1.846 | 0.067 | 1.54000 | 33.0 | 1.20 |
| 8 | ∞ | 0.300 | 1.47400 | 56.4 | 1.30 |
| 9 | ∞ | 0.148 | 1.51400 | 58.1 | 1.45 |
| 10* | 0.982 | 0.265 | | | 1.50 |
| 11 | ∞ | 0.300 | 1.51630 | 64.1 | 1.62 |
| 12 | ∞ | | | | 1.70 |

Aspherical coefficients are listed below.

First surface

K = 0.58311E+00, A4 = −0.54768E−01, A6 = −0.14172E+00,
A8 = 0.14447E+00, A10 = −0.10370E+01
Fourth surface K = 0.92173E+01, A4 = 0.79230E−01, A6 = 0.21572E+00,
A8 = −0.11343E+01, A10 = 0.78484E+01
Fifth surface K = 0.85946E+00, A4 = −0.51625E+00, A6 = −0.39987E+00,
A8 = −0.30533E+00, A10 = 0.41271E+01, A12 = −0.37229E+02,
A14 = 0.93731E+02
Sixth surface K = 0.12394E+01, A4 = −0.48765E+00, A6 = 0.80583E+00,
A8 = −0.95975E+00, A10 = 0.25339E+00, A12 = 0.11278E+01,
A14 = 0.58523E+00
Seventh surface K = −0.17906E+02, A4 = −0.55729E+00, A6 = 0.35754E+00,
A8 = −0.10052E−01, A10 = −0.55453E−01, A12 = 0.13631E−01
Tenth surface K = −0.62139E+01, A4 = −0.19470E+00, A6 = 0.89227E−01,
A8 = −0.49374E−01, A10 = 0.18147E−01, A12 = −0.26270E−02

Single lens data of the imaging lens of Example 5 is listed below.

| Lens | Starting Surface | Focal Length (mm) |
|---|---|---|
| 1 | 1 | 2.642 |
| 2 | 5 | 16.228 |
| 3 | 7 | −5.612 |

In Example 5 the lens section formed on the object side and the lens section formed on the image side of the substrate of the third lens are formed of different resin materials.

Figure 13:
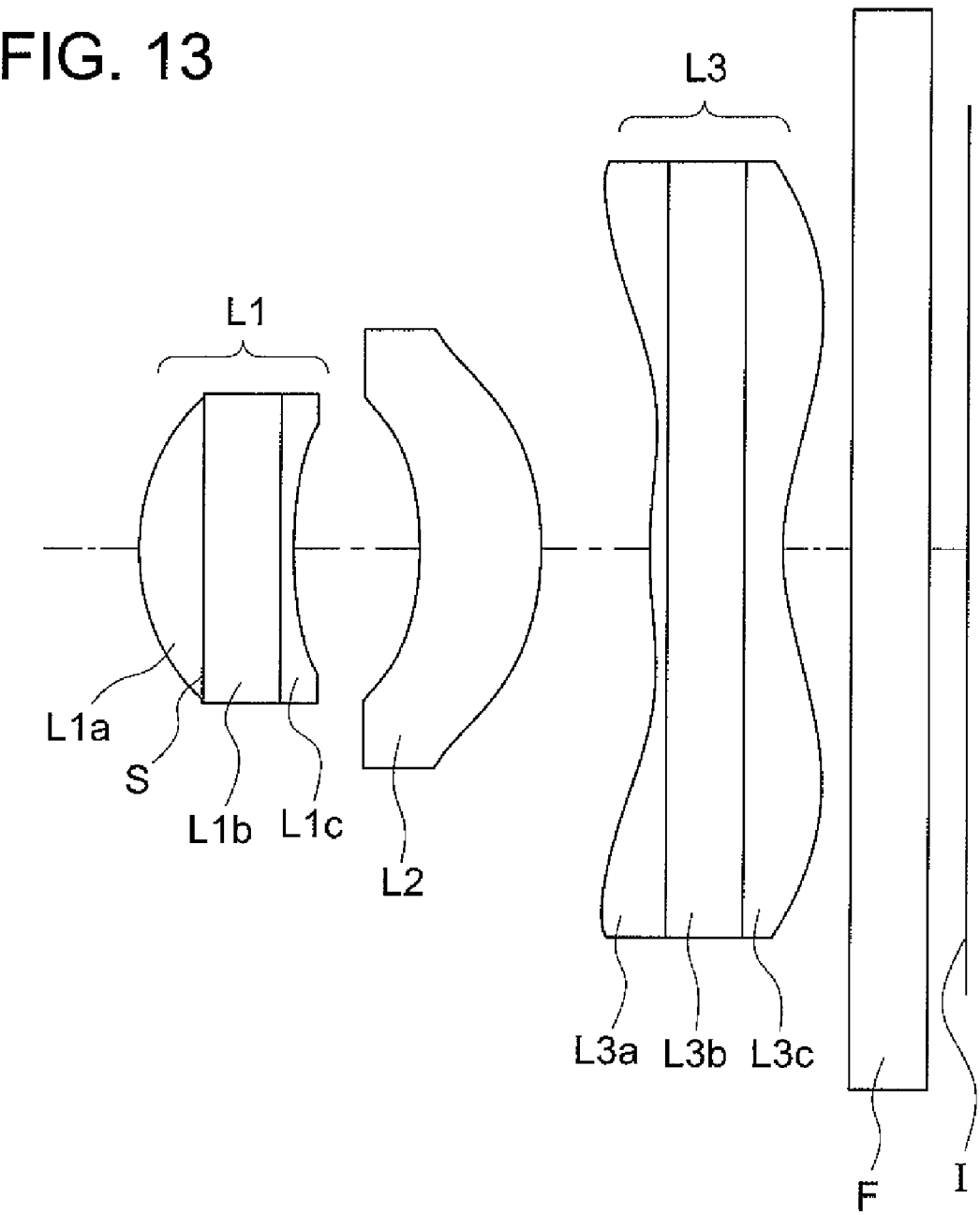
FIG. 13 is a sectional view of the imaging lens shown in Example 5.

FIG. 13, is a sectional view of the imaging lens shown in Example 5 which is constituted, in the order from the object side along the optical axis, of a first lens L1, a second lens L2, a third lens L3, an optical low pass filter, an IR cut filter, a parallel plate F in which a seal glass of a solid-state imaging element is assumed, and the imaging surface I of a solid-state imaging element. Further, the first lens L1 is a lens block which is constituted, in the order from the object side along the optical axis, of a lens section L1a of the object side, an aperture stop S, a substrate section L1b, and a lens section L1c of the image side. The second lens L2 is a single lens. The third lens L3 is a block lens which is constituted, in the order from the object side along the optical axis, of a lens section L3a of the object side, a substrate section L3b, and a lens section L3c of the image side.

Figure 14:
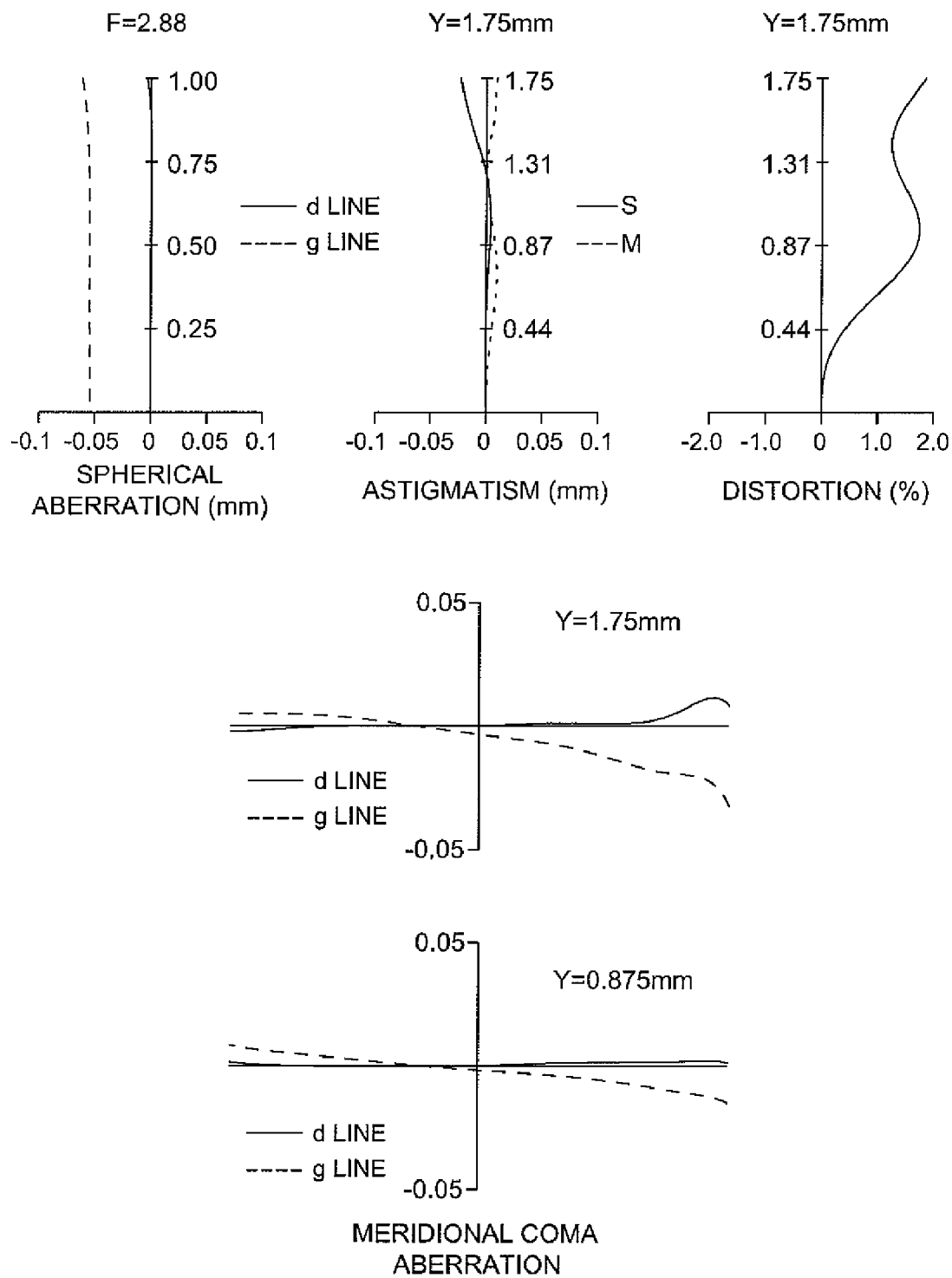
FIG. 14 is an aberration diagram (spherical aberration, astigmatism, distortion, and meridional coma aberration) of the imaging lens shown in Example 5.

FIG. 14 is an aberration diagram (spherical aberration, astigmatism, distortion, and meridional coma aberration) of the imaging lens shown in Example 5.

Example 6

The entire data of the imaging lenses of Example 5 is listed below.

f = 2.75 mm
fB = 0.1 m
F = 2.88
2Y = 3.5 mm
ENTP = 0.18 mm
EXTP = −1.63 mm
H1 = −1.41 mm
H2 = −2.63 mm

Surface data of the imaging lens of Example 6 is listed below.

| Surface Number | R (mm) | D (mm) | Nd | vd | Effective Radius (mm) |
|---|---|---|---|---|---|
| 1* | 0.877 | 0.242 | 1.51400 | 58.1 | 0.51 |
| 2 (aperture) | ∞ | 0.300 | 1.64920 | 29.9 | 0.46 |
| 3 | ∞ | 0.050 | 1.51400 | 58.1 | 0.48 |
| 4* | 1.924 | 0.506 | | | 0.49 |
| 5* | −1.512 | 0.538 | 1.52640 | 53.8 | 0.61 |
| 6* | −1.323 | 0.499 | | | 0.83 |
| 7* | 1.505 | 0.400 | 1.63200 | 23.4 | 1.23 |
| 8* | 0.823 | 0.265 | | | 1.50 |
| 9 | ∞ | 0.300 | 1.51630 | 64.1 | 1.64 |
| 10 | ∞ | | | | 1.72 |

Aspherical coefficients are listed below.

First surface

K = 0.75160E+00, A4 = −0.69312E−01, A6 = −0.30162E+00,
A8 = 0.57902E+00, A10 = −0.25287E+01
Fourth surface K = 0.10091E+02, A4 = 0.81654E−01, A6 = 0.30135E+00,
A8 = −0.15402E+01, A10 = 0.77679E+01
Fifth surface K = −0.46562E+00, A4 = −0.48486E+00, A6 = −0.51244E+00,
A8 = 0.45175E−01, A10 = 0.60681E+01, A12 = −0.37256E+02,
A14 = 0.72437E+02
Sixth surface K = 0.74923E+00, A4 = −0.42849E+00, A6 = 0.72937E+00,
A8 = −0.10055E+01, A10 = 0.33094E+00, A12 = 0.11197E+01,
A14 = −0.32574E+00

-continued

Seventh surface

K = −0.16759E+02, A4 = −0.62532E+00, A6 = 0.36215E+00,
A8 = 0.33901E−03, A10 = −0.54081E−01, A12 = 0.12256E−01
Eighth surface K = −0.70066E+01, A4 = −0.25128E+00, A6 = 0.12397E+00,
A8 = −0.56186E−01, A10 = 0.17834E−01, A12 = −0.24093E−02

Single lens data of the imaging lens of Example 6 is listed below.

| Lens | Starting Surface | Focal Length (mm) |
|---|---|---|
| 1 | 1 | 2.648 |
| 2 | 5 | 10.128 |
| 3 | 7 | −3.722 |

In Example 6, all of the lens sections formed on the substrate sections are formed of the same resin material.

Figure 15:
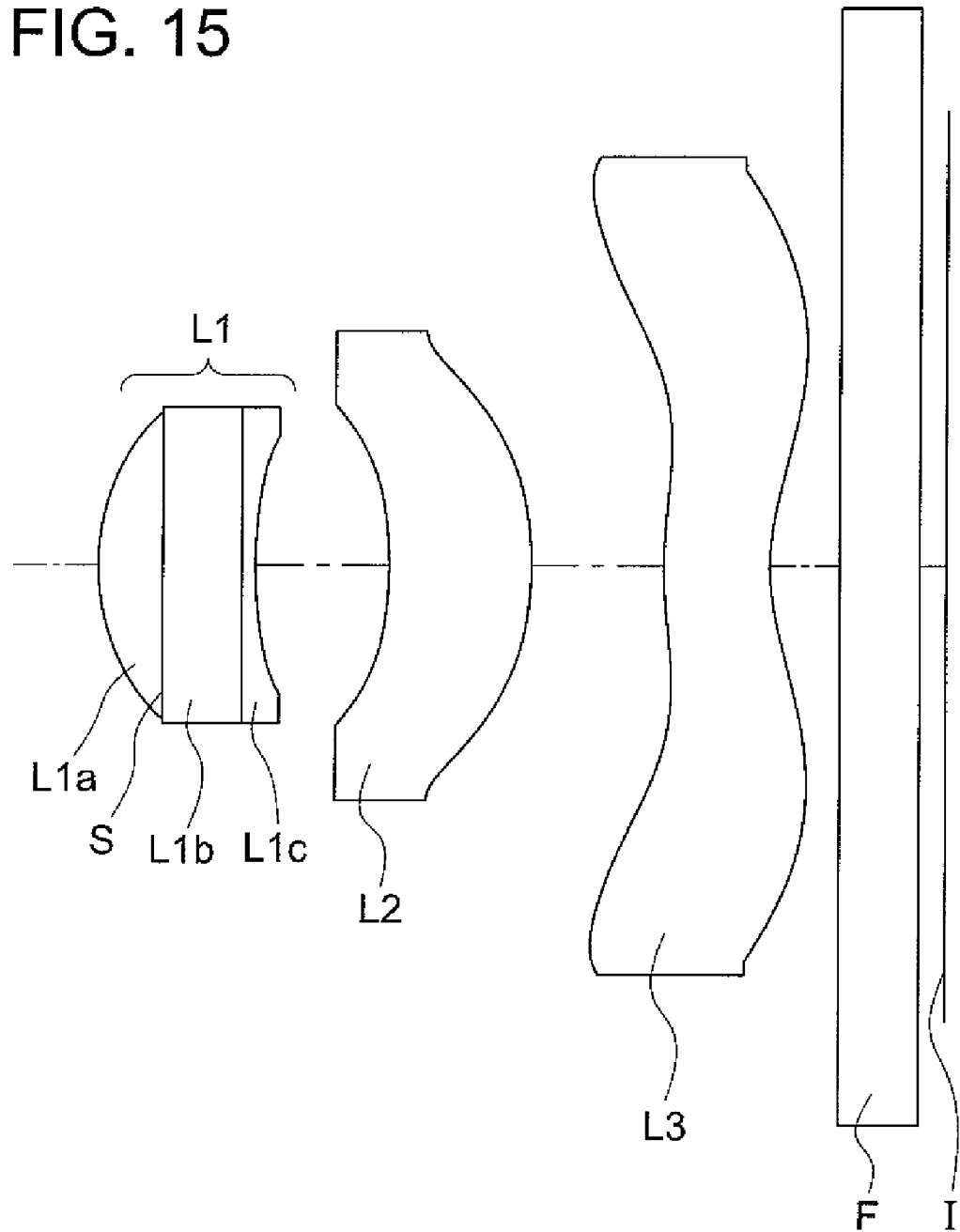
FIG. 15 is a sectional view of the imaging lens shown in Example 6.

FIG. 15, is a sectional view of the imaging lens shown in Example 6 which is constituted, in the order from the object side along the optical axis, of a first lens L1, a second lens L2, a third lens L3, an optical low pass filter, an IR cut filter, a parallel plate F in which a seal glass of a solid-state imaging element is assumed, and the imaging surface I of a solid-state imaging element. Further, the first lens L1 is a lens block which is constituted, in the order from the object side along the optical axis, of a lens section L1a of the object side, an aperture stop S, a substrate section L1b, and a lens section L1c of the image side. Both the second lens L2 and the third lens L3 are single lenses.

Figure 16:
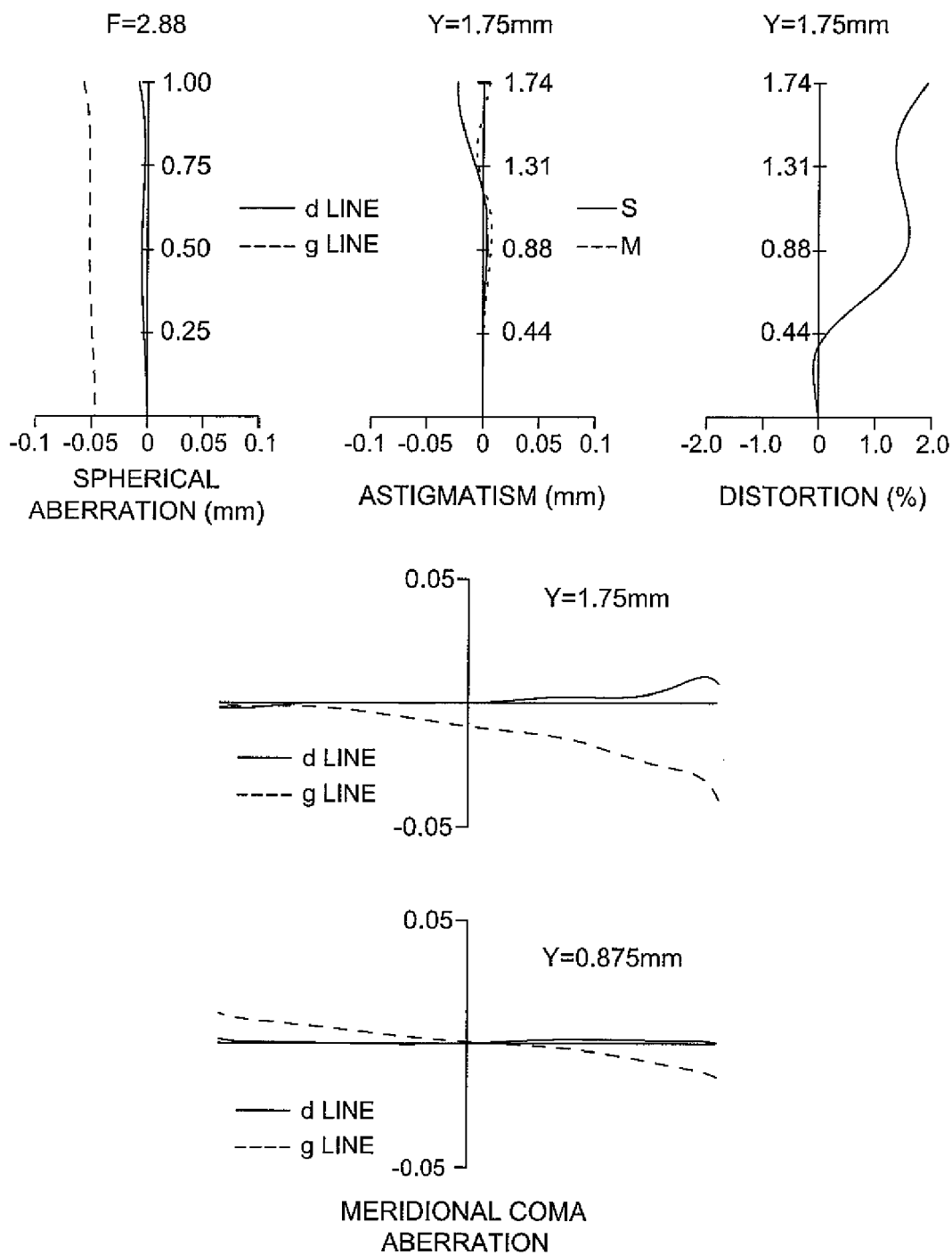
FIG. 16 is an aberration diagram (spherical aberration, astigmatism, distortion, and meridional coma aberration) of the imaging lens shown in Example 6.

FIG. 16 is an aberration diagram (spherical aberration, astigmatism, distortion, and meridional coma aberration) of the imaging lens shown in Example 6.

Example 7

The entire data of the imaging lenses of Example 5 is listed below.

f = 2.78 mm
fB = 0.12 m
F = 2.88
2Y = 3.5 mm
ENTP = 0.18 mm
EXTP = −1.70 mm
H1 = −1.31 mm
H2 = −2.67 mm

Surface data of the imaging lens of Example 7 is listed below.

| Surface Number | R (mm) | D (mm) | Nd | vd | Effective Radius (mm) |
|---|---|---|---|---|---|
| 1* | 0.852 | 0.250 | 1.51400 | 58.1 | 0.51 |
| 2 (aperture) | ∞ | 0.300 | 1.64920 | 29.9 | 0.46 |
| 3 | ∞ | 0.050 | 1.54000 | 33.0 | 0.48 |
| 4* | 1.927 | 0.484 | | | 0.48 |
| 5* | −1.449 | 0.557 | 1.52640 | 53.8 | 0.60 |
| 6* | −1.310 | 0.485 | | | 0.84 |
| 7* | 1.784 | 0.400 | 1.54700 | 56.0 | 1.23 |
| 8* | 0.896 | 0.265 | | | 1.50 |
| 9 | ∞ | 0.300 | 1.51630 | 64.1 | 1.64 |
| 10 | ∞ | | | | 1.71 |

-continued

Aspherical coefficients are listed below.

First surface

K = 0.77589E+00, A4 = −0.89634E−01, A6 = −0.36079E+00,
A8 = 0.93422E+00, A10 = −0.43858E+01
Fourth surface K = 0.10578E+02, A4 = 0.74619E−01, A6 = 0.45346E+00,
A8 = −0.22408E+01, A10 = 0.10808E+02
Fifth surface K = −0.94671E+00, A4 = −0.50836E+00, A6 = −0.27534E+00,
A8 = −0.44126E+00, A10 = 0.47189E+01, A12 = −0.26483E+02,
A14 = 0.60369E+02
Sixth surface K = 0.71531E+00, A4 = −0.35633E+00, A6 = 0.69867E+00,
A8 = −0.10219E+01, A10 = 0.52662E+00, A12 = 0.12897E+01,
A14 = −0.80978E+00
Seventh surface K = −0.23848E+02, A4 = −0.62334E+00, A6 = 0.37834E+00,
A8 = −0.22158E−02, A10 = −0.56302E−01, A12 = 0.12837E−01
Eighth surface K = −0.67701E+01, A4 = −0.24272E+00, A6 = 0.12012E+00,
A8 = −0.57743E−01, A10 = 0.18580E−01, A12 = −0.24483E−02

Single lens data of the imaging lens of Example 7 is listed below.

| Lens | Starting Surface | Focal Length (mm) |
|---|---|---|
| 1 | 1 | 2.583 |
| 2 | 5 | 10.889 |
| 3 | 7 | −3.915 |

In Example 7, the lens section formed on the object side and the lens section formed on the image side of the substrate of the first lens are formed of different resin materials.

Figure 17:
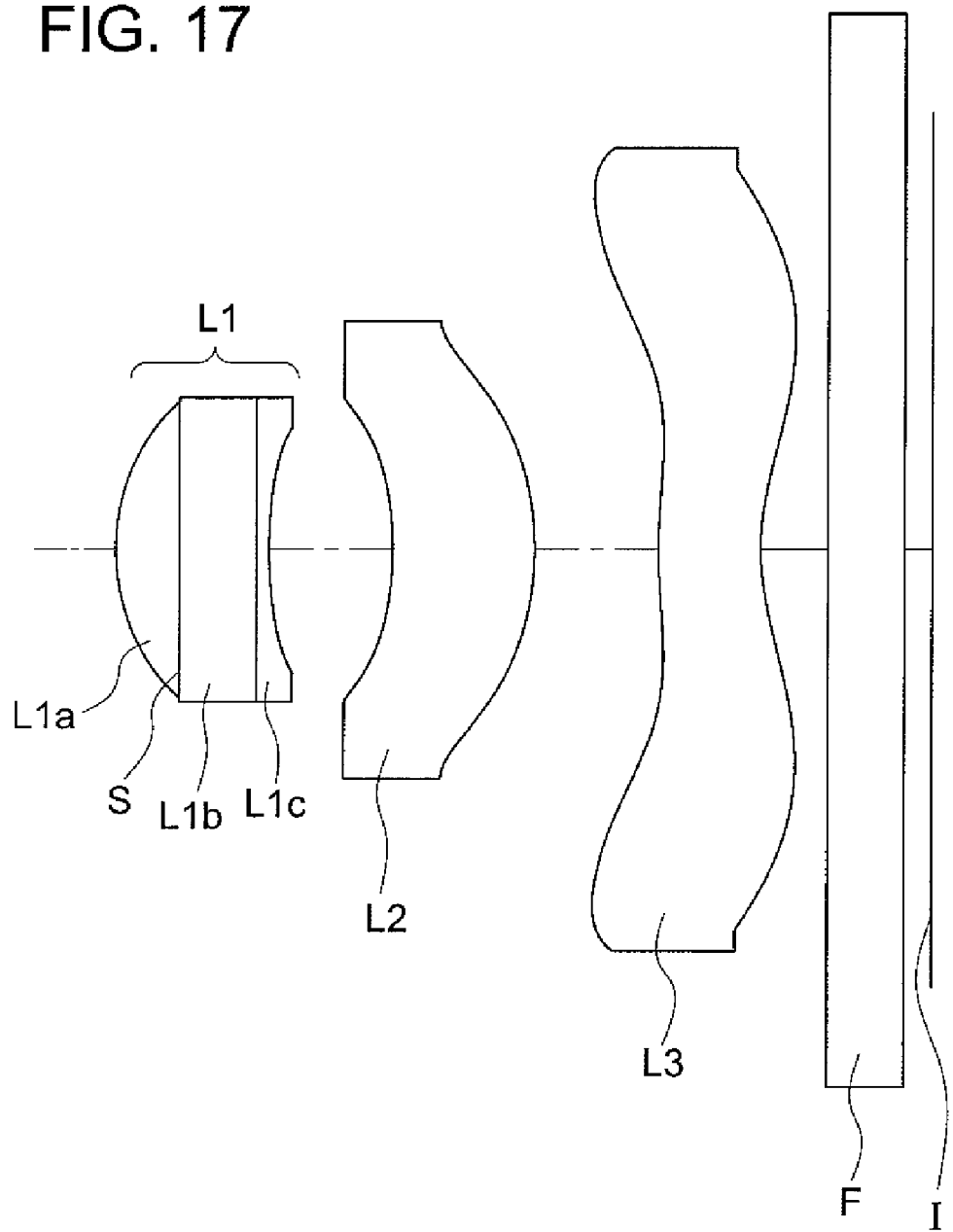
FIG. 17 is a sectional view of the imaging lens shown in Example 7.

FIG. 17, is a sectional view of the imaging lens shown in Example 7 which is constituted, in the order from the object side along the optical axis, of a first lens L1, a second lens L2, a third lens L3, an optical low pass filter, an IR cut filter, a parallel plate F in which a seal glass of a solid-state imaging element is assumed, and the imaging surface I of a solid-state imaging element. Further, the first lens L1 is a lens block which is constituted, in the order from the object side along the optical axis, of a lens section L1a of the object side, an aperture stop S, a substrate section L1b, and a lens section L1c of the image side. Both the second lens L2 and the third lens L3 are single lenses.

Figure 18:
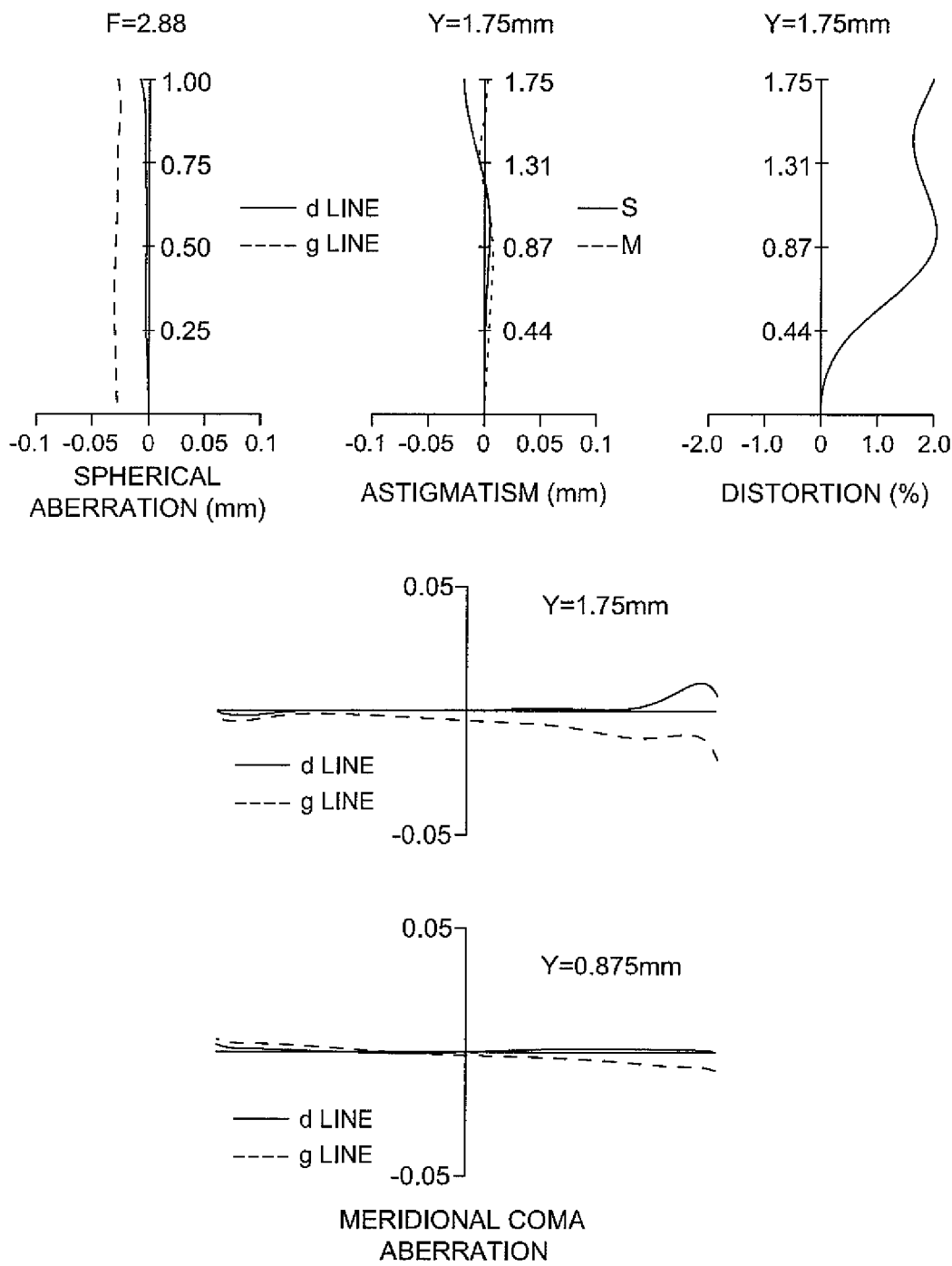
FIG. 18 is an aberration diagram (spherical aberration, astigmatism, distortion, and meridional coma aberration) of the imaging lens shown in Example 7.

FIG. 18 is an aberration diagram (spherical aberration, astigmatism, distortion, and meridional coma aberration) of the imaging lens shown in Example 7.

Example 8

The entire data of the imaging lenses of Example 8 is listed below.

f = 2.46 mm
fB = 0.20 m
F = 2.88
2Y = 3.5 mm
ENTP = 0.14 mm
EXTP = −1.62 mm
H1 = −0.71 mm
H2 = −2.26 mm

-continued

Surface data of the imaging lens of Example 8 is listed below.

| Surface Number | R (mm) | D (mm) | Nd | vd | Effective Radius (mm) |
|---|---|---|---|---|---|
| 1* | 0.946 | 0.201 | 1.51400 | 58.1 | 0.46 |
| 2 (aperture) | ∞ | 0.300 | 1.64920 | 29.9 | 0.41 |
| 3 | ∞ | 0.050 | 1.51400 | 58.1 | 0.46 |
| 4* | 2.286 | 0.459 | | | 0.48 |
| 5* | −2.341 | 0.890 | 1.52640 | 53.8 | 0.63 |
| 6* | −0.995 | 0.200 | | | 0.93 |
| 7* | 1.718 | 0.400 | 1.63200 | 23.4 | 1.13 |
| 8* | 0.696 | 0.315 | | | 1.48 |
| 9 | ∞ | 0.200 | 1.51630 | 64.1 | 1.62 |
| 10 | ∞ | | | | 1.67 |

Aspherical coefficients are listed below.

First surface

K = 0.93086E+00, 4 = −0.44171E−01, A6 = −0.32720E+00,
A8 = 0.66567E+00, A10 = −0.14742E+01.
Fourth surface K = 0.90114E+01, A4 = 0.14931E+00, A6 = 0.39723E+00,
A8 = −0.94261E+00, A10 = 0.64118E+01
Fifth surface K = −0.80161E+01, A4 = −0.26422E+00, A6 = −0.91341E+00,
A8 = −0.37717E+00, A10 = 0.10403E+02, A12 = −0.32261E+02,
A14 = 0.38107E+02
Sixth surface K = −0.38908E+00, A4 = −0.36779E+00, A6 = 0.74698E+00,
A8 = −0.88300E+00, A10 = 0.26488E−01, A12 = 0.69897E+00,
A14 = −0.22672E+00
Seventh surface K = −0.30000E+02, A4 = −0.84056E+00, A6 = 0.55177E+00,
A8 = −0.17421E−01, A10 = −0.82653E−01, A12 = 0.17336E−01
Eighth surface K = −0.54862E+01, A4 = −0.29700E+00, A6 = 0.17929E+00,
A8 = −0.85911E−01, A10 = 0.26154E−01, A12 = −0.34755E−02

Single lens data of the imaging lens of Example 8 is listed below.

| Lens | Starting Surface | Focal Length (mm) |
|---|---|---|
| 1 | 1 | 2.758 |
| 2 | 5 | 2.675 |
| 3 | 7 | −2.182 |

In Example 8, all of the lens sections formed on the substrate sections are formed of the same resin material.

Figure 19:
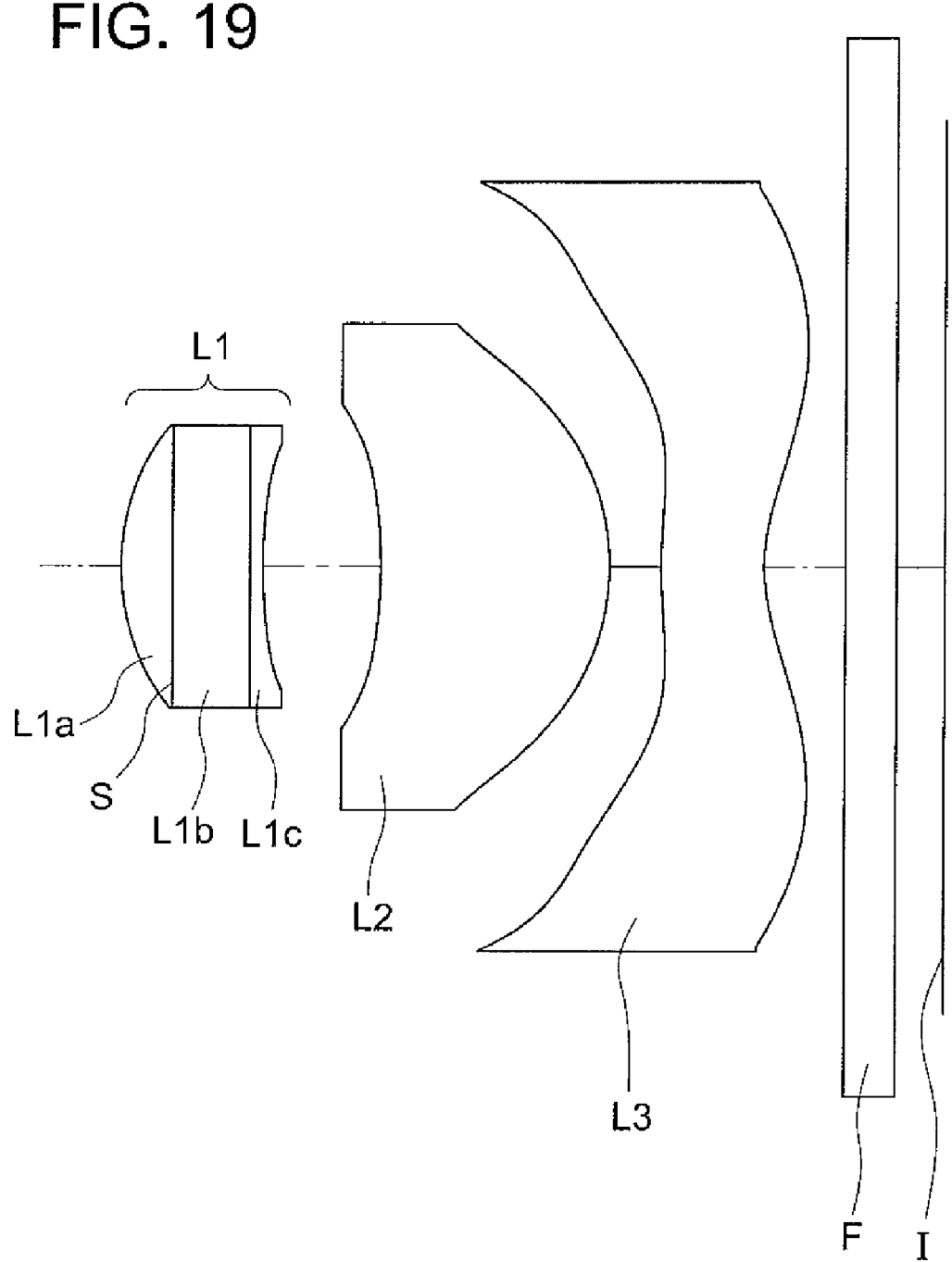
FIG. 19 is a sectional view of the imaging lens shown in Example 8.

FIG. 19, is a sectional view of the imaging lens shown in Example 8 which is constituted, in the order from the object side along the optical axis, of a first lens L1, a second lens L2, a third lens L3, an optical low pass filter, an IR cut filter, a parallel plate F in which a seal glass of a solid-state imaging element is assumed, and the imaging surface I of a solid-state imaging element. Further, the first lens L1 is a lens block which is constituted, in the order from the object side along the optical axis, of a lens section L1a of the object side, an aperture stop S, a substrate section L1b, and a lens section L1c of the image side. Both the second lens L2 and the third lens L3 are single lenses.

Figure 20:
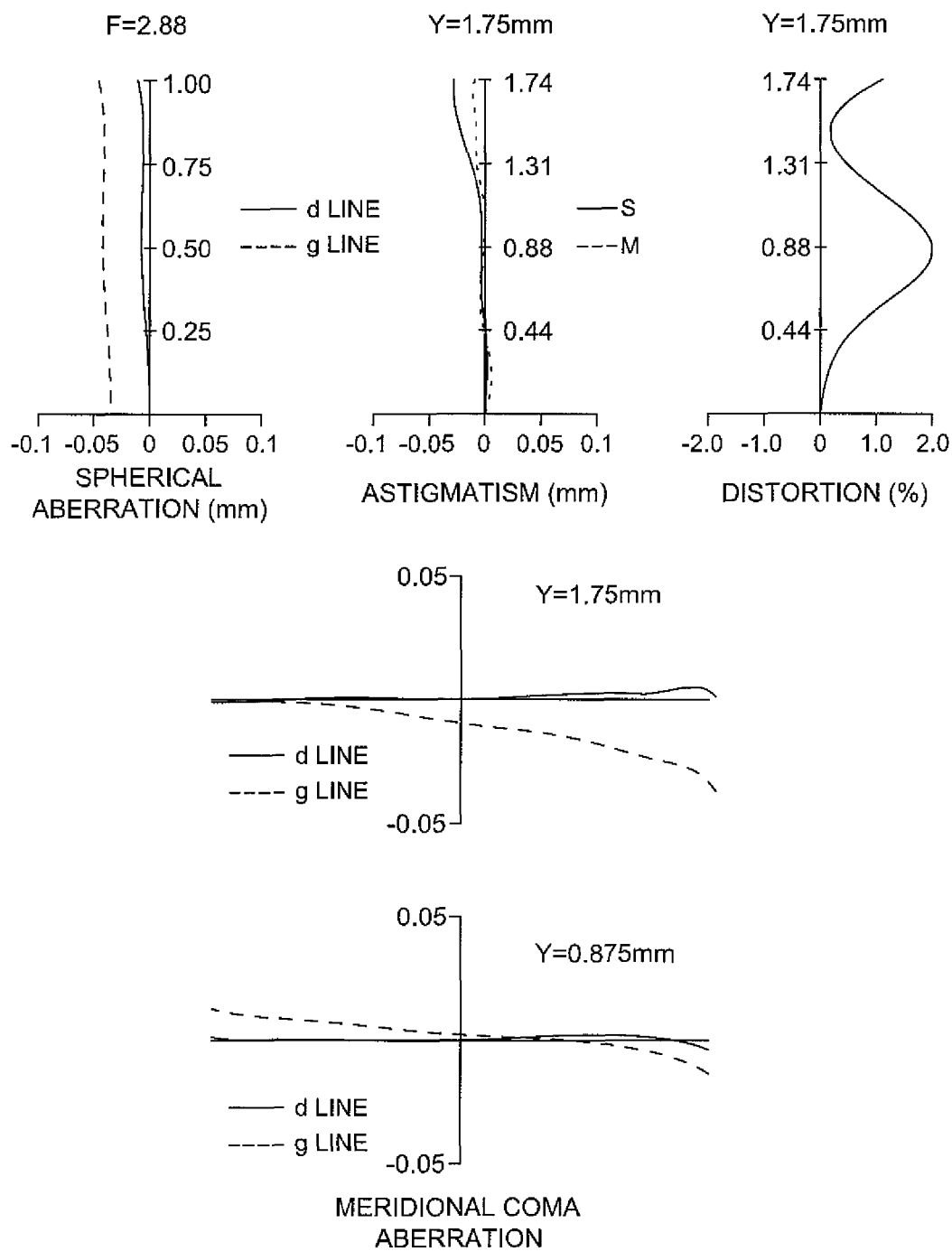
FIG. 20 is an aberration diagram (spherical aberration, astigmatism, distortion, and meridional coma aberration) of the imaging lens shown in Example 8.

FIG. 20 is an aberration diagram (spherical aberration, astigmatism, distortion, and meridional coma aberration) of the imaging lens shown in Example 8.

Example 9

The entire data of the imaging lenses of Example 9 is listed below.

f = 2.43 mm
fB = 0.28 m
F = 2.88
2Y = 3.5 mm
ENTP = 0.00 mm
EXTP = −1.92 mm
H1 = −0.25 mm
H2 = −2.15 mm

Surface data of the imaging lens of Example 9 is listed below.

| Surface Number | R (mm) | D (mm) | Nd | vd | Effective Radius (mm) |
|---|---|---|---|---|---|
| 1 (aperture) | ∞ | 0.00 | | | 0.42 |
| 2* | 0.977 | 0.24 | 1.51400 | 58.1 | 0.55 |
| 3 | ∞ | 0.30 | 1.64920 | 29.9 | 0.55 |
| 4 | ∞ | 0.05 | 1.51400 | 58.1 | 0.56 |
| 5* | 2.278 | 0.47 | | | 0.57 |
| 6* | −1.382 | 0,52 | 1.52640 | 53.8 | 0.64 |
| 7* | −1.301 | 0.24 | | | 0.84 |
| 8* | 0.945 | 0.14 | 1.51400 | 58.1 | 1.25 |
| 9 | ∞ | 0.30 | 1.47400 | 56.4 | 1.30 |
| 10 | ∞ | 0.05 | 1.51400 | 58.1 | 1.43 |
| 11* | 0.742 | 0.36 | | | 1.52 |
| 12 | ∞ | 0.20 | 1.51630 | 64.1 | 1.60 |
| 13 | ∞ | | | | 1.65 |

Aspherical coefficients are listed below.

Secondt surface

K = 0.44598E+00, A4 = −0.12396E−01, A6 = −0.52445E−01,
A8 = 0.59125E+00, A10 = −0.13628E+01
Fifth surface K = 0.74954E+01, A4 = 0.11000E+00, A6 = 0.41812E+00,
A8 = −0.18798E+01, A10 = 0.63713E+01
Sixth surface K = −0.11862E+00, A4 = −0.23201E+00, A6 = −0.11420E+01,
A8 = 0.87337E+00, A10 = 0.60871E+01, A12 = −0.36147E+02,
A14 = 0.59522E+02
Seventh surface K = 0.10043E+01, A4 = −0.66616E+00, A6 = 0.11882E+01,
A8 = −0.11295E+01, A10 = −0.27088E+00, A12 = 0.79058E+00,
A14 = 0.90501E+00
Eighth surface K = −0.58791E+01, A4 = −0.53061E+00, A6 = 0.31852E+00,
A8 = −0.61982E−02, A10 = −0.48763E−01, A12 = 0.11672E−01
Eleventh surface K = −0.3488E+01, A4 = −0.24850E+00, A6 = 0.13757E+00,
A8 = −0.58057E−01, A10 = 0.15655E−01, A12 = −0.19621E−02

Single lens data of the imaging lens of Example 9 is listed below.

| Lens | Starting Surface | Focal Length (mm) |
|---|---|---|
| 1 | 2 | 3.135 |
| 2 | 6 | 13.143 |
| 3 | 8 | −39.847 |

In Example 9, all of the lens sections formed on the substrate sections are formed of the same resin material.

Figure 21:
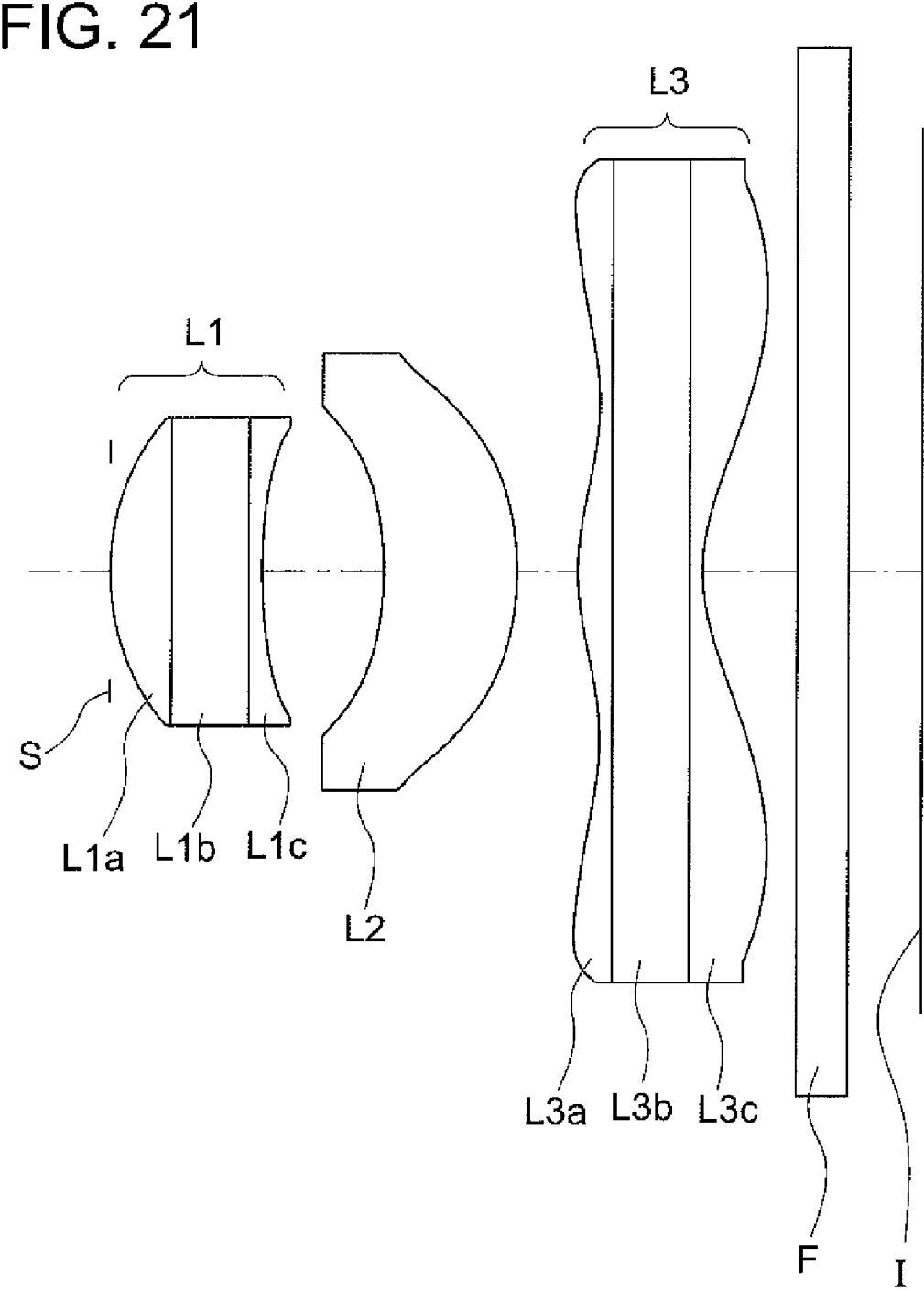
FIG. 21 is a sectional view of the imaging lens shown in Example 9.

FIG. 21, is a sectional view of the imaging lens shown in Example 9 which is constituted, in the order from the object side along the optical axis, of a first lens L1, a second lens L2, a third lens L3, an optical low pass filter, an IR cut filter, a parallel plate F in which a seal glass of a solid-state imaging element is assumed, and the imaging surface I of a solid-state imaging element. Further, the first lens L1 is a lens block which is constituted, in the order from the object side along the optical axis, of a lens section L1a of the object side, an aperture stop S, a substrate section L1b, and a lens section L1c of the image side. The second lens L2 is a single lens. The third lens L3 is a block lens which is constituted, in the order from the object side along the optical axis, of a lens section L3a of the object side, a substrate section L3b, and a lens section L3c of the image side.

In Example 9, the aperture stop S positions at the most object side. Such a constitution makes it possible that the angle of the incident light to the solid-state imaging element is reduced because the exit pupil position shifts to the object side.

Figure 22:
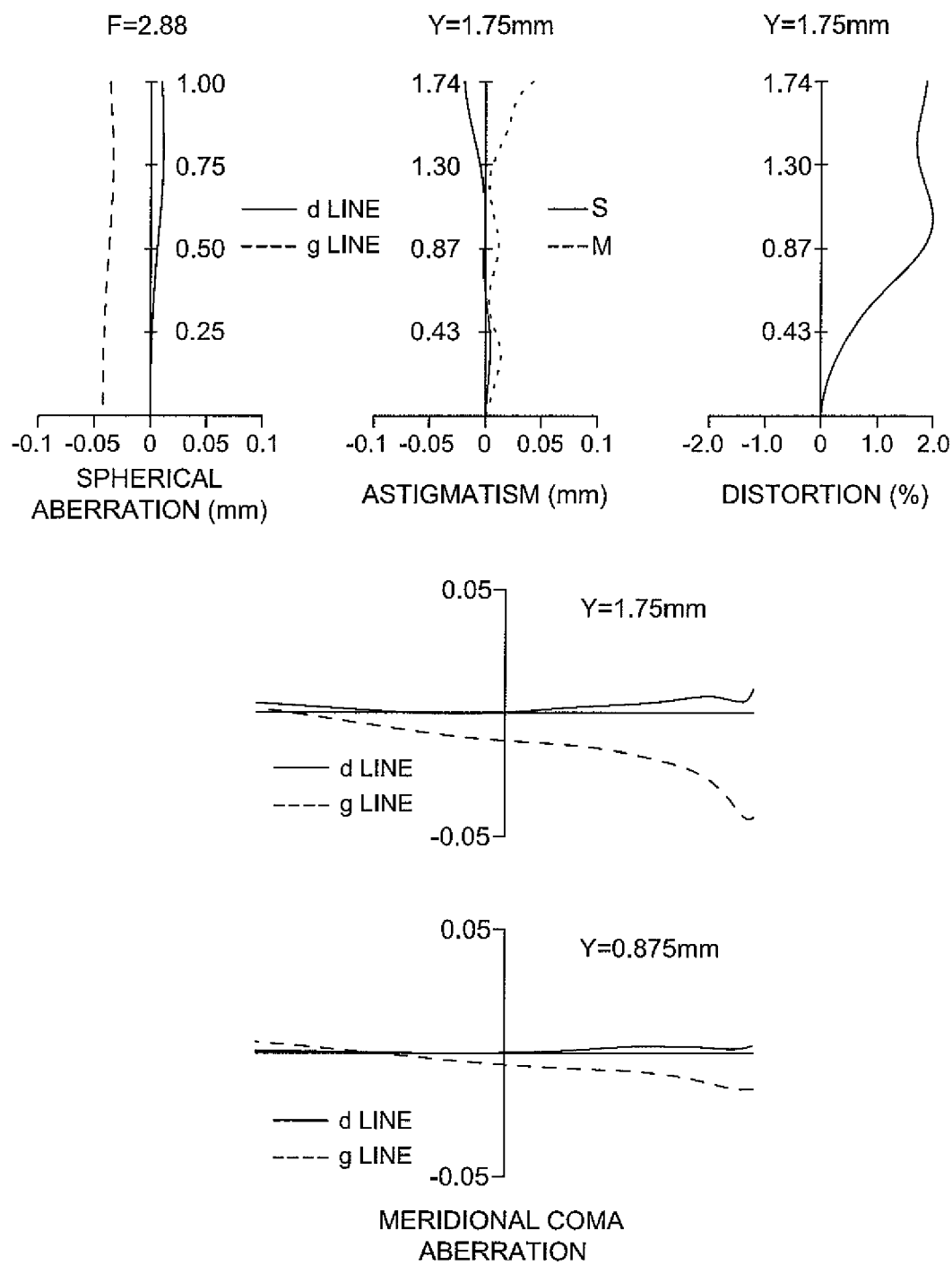
FIG. 22 is an aberration diagram (spherical aberration, astigmatism, distortion, and meridional coma aberration) of the imaging lens shown in Example 9.

FIG. 22 is an aberration diagram (spherical aberration, astigmatism, distortion, and meridional coma aberration) of the imaging lens shown in Example 9.

Example 10

The entire data of the imaging lenses of Example 10 is listed below.

f = 2.63 mm
fB = 0.37 m
F = 2.88
2Y = 3.5 mm
ENTP = 0.09 mm
EXIT = −1.78 mm
H1 = −0.49 mm
H2 = −2.25 mm

Surface data of the imaging lens of Example 10 is listed below.

| Surface Number | R (mm) | D (mm) | Nd | vd | Effective Radius (mm) |
|---|---|---|---|---|---|
| 1* | 1.588 | 0.129 | 1.51400 | 58.1 | 0.48 |
| 2 (aperture) | ∞ | 0.350 | 1.64920 | 29.9 | 0.45 |
| 3 | ∞ | 0.653 | | | 0.54 |
| 4* | −2.128 | 0.615 | 1.52640 | 53.8 | 0.74 |
| 5* | −1.452 | 0.220 | | | 0.88 |
| 6* | 1.709 | 0.655 | 1.63200 | 23.4 | 1.02 |
| 7* | 0.975 | 0.315 | | | 1.44 |
| 8* | ∞ | 0.200 | 1.51630 | 64.1 | 1.55 |
| 9 | ∞ | | | | 1.61 |

Aspherical coefficients are listed below.

First surface

K = 0.11093E+01, A4 = −0.31060E−01, A6 = −0.30240E+00,
A8 = 0.12068E+01, A10 = −0.20477E+01
Fourth surface K = 0.10718E+00, A4 = −0.96415E−01, A6 = 0.29813E+00,
A8 = −0.33435E+01, A10 = 0.12216E+02, A12 = −0.16594E+02,
A14 = 0.80932E+01
Fifth surface K = 0.12791E+00, A4 = −0.47181E+00, A6 = 0.68687E+00,
A8 = −0.65126E+00, A10 = 0.24875E+00, A12 = 0.74613E+00,
A14 = −0.50937E+00

Sixth surface

K = −0.38681E+00, A4 = −0.74016E+00, A6 = 0.16989E+00,
A8 = 0.37055E+00, A10 = −0.33587E+00, A12 = 0.76047E−01
Seventh surface K = −0.29508E+01, A4 = −0.35149E+00, A6 = 0.23721E+00,
A8 = −0.10953E+00, A10 = 0.27644E−01, A12 = −0.30214E−02

Single lens data of the imaging lens of Example 10 is listed below.

| Lens | Starting Surface | Focal Length (mm) |
|---|---|---|
| 1 | 1 | 3.089 |
| 2 | 4 | 6.608 |
| 3 | 6 | −5.487 |

In Example 10, the lens section is formed of resin material only on the object side of the first lens L1.

Figure 23:
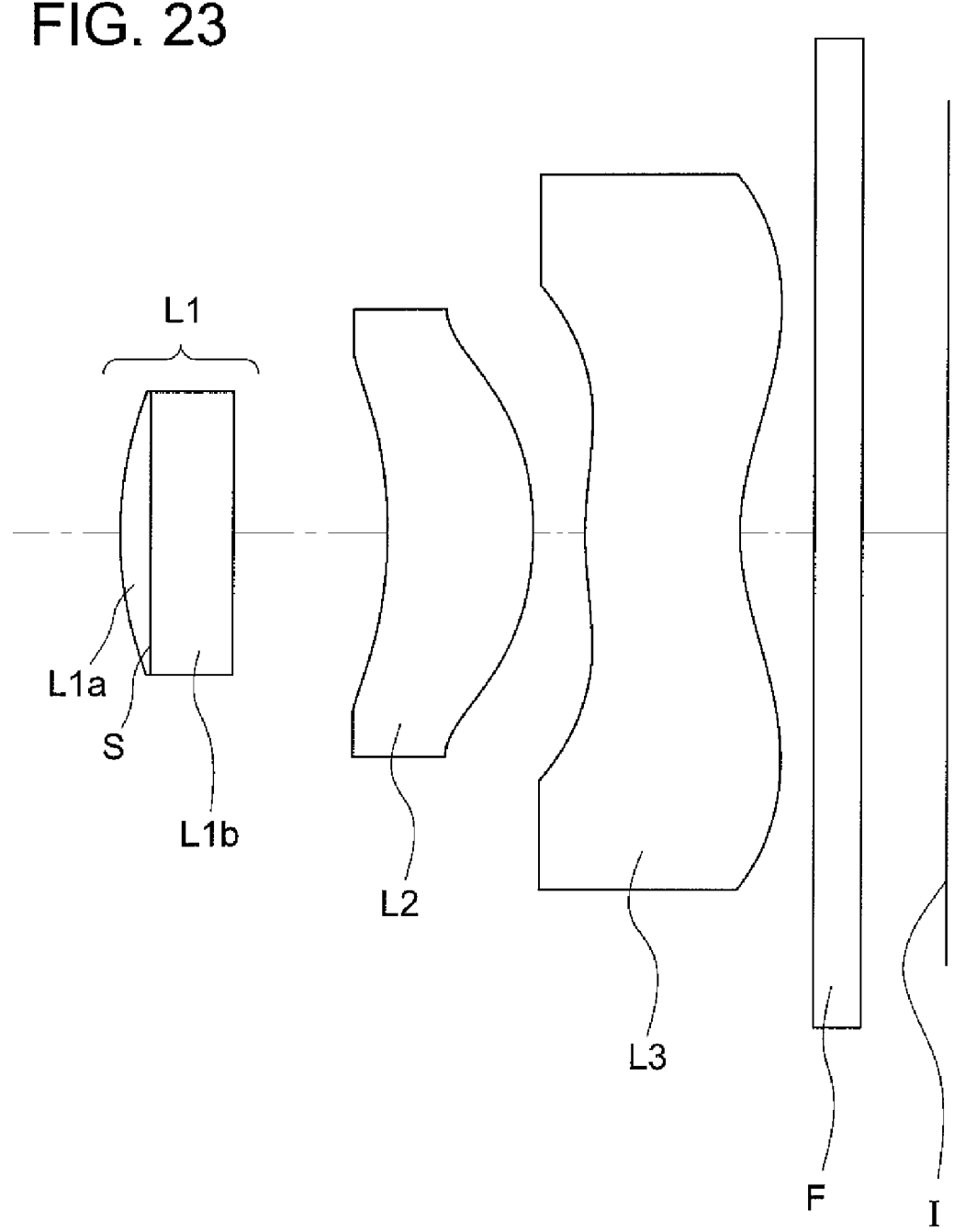
FIG. 23 is a sectional view of the imaging lens shown in Example 10.

FIG. 23, is a sectional view of the imaging lens shown in Example 10 which is constituted, in the order from the object side along the optical axis, of a first lens L1, a second lens L2, a third lens L3, an optical low pass filter, an IR cut filter, a parallel plate F in which a seal glass of a solid-state imaging element is assumed, and the imaging surface I of a solid-state imaging element. Further, the first lens L1 is a lens block which is constituted, in the order from the object side along the optical axis, of an aperture stop S, a lens section L1a of the object side and a substrate section L1b. Both the second lens L2 and the third lens L3 are single lenses.

Figure 24:
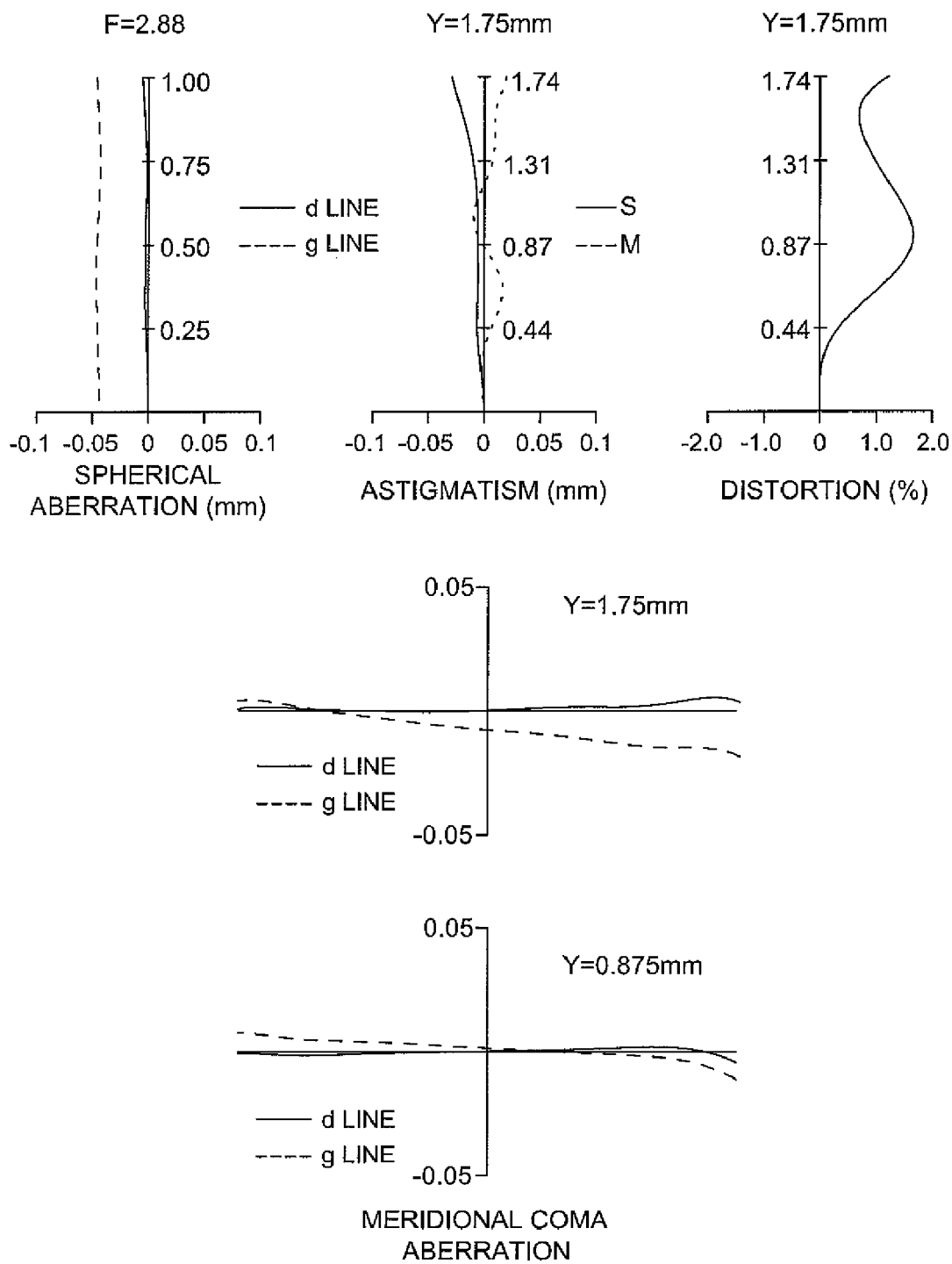
FIG. 24 is an aberration diagram (spherical aberration, astigmatism, distortion, and meridional coma aberration) of the imaging lens shown in Example 10.

FIG. 24 is an aberration diagram (spherical aberration, astigmatism, distortion, and meridional coma aberration) of the imaging lens shown in Example 10.

Conditional expressions (1), (2), and (3) of the above mentioned examples 1 through 10 are shown as the followings:

| | Conditional expression | | |
|---|---|---|---|
| | (1) f2/f | (2) r3/r4 | (3) v1−v2 |
| examples 1 | 9.348 | 0.978 | 0.0 |
| examples 2 | 19.797 | 0.920 | 0.0 |
| examples 3 | 6.434 | 1.022 | 0.0 |
| examples 4 | 9.073 | 0.997 | 25.1 |
| examples 5 | 5.910 | 1.031 | 0.0 |
| examples 6 | 3.688 | 1.143 | 0.0 |
| examples 7 | 3.913 | 1.106 | 25.1 |
| examples 8 | 1.089 | 2.354 | 0.0 |
| examples 9 | 5.401 | 1.063 | 0.0 |
| examples 10 | 2.516 | 1.466 | — |

Lens sections are formed on both the object side and the image surface side of the substrate section of the first lens L1 in the embodiments 1 through 9, and the lens section is formed only on the object side of the first lens L1 in embodiment 10. However the lens section is formed only on the image side of the first lens L1.

DESCRIPTION OF ALPHANUMERIC DESIGNATIONS

S: an aperture stop
L1: a fast lens
L1a: a lens section of an object side (first lens)
L1b: a substrate section (first lens)
L1c: a lens section of an image side (first lens)
L2: a second lens
L3: a third lens
L3a: a lens section of an object side (third lens)

L3*b*: a substrate section (third lens)
L3*c*: a lens section of an image side (third lens)
50: an imaging device
51: an imaging element
52*a*: a support substrate
52*b*: a flexible print substrate
53: a housing
55: a lens frame
100: a mobile phone

The invention claimed is:

1. An imaging lens focusing an object image on a photoelectric conversion section of a solid-state imaging element, the imaging lens comprising, in an order from an object side:
    a first lens having positive refractive power;
    a second lens having positive refractive power; and
    a third lens having negative refractive power,
        wherein the first lens is provided with a substrate section which is a parallel plate and a lens section formed of a material differing in refractive index from the substrate section at least on either of an object side surface and an image side surface of the substrate section and the second lens is a single lens satisfying the following conditional expression:

$$1 < f2/f < 20$$

wherein f2 represents a focal length of the second lens and f represents a focal length of an entire imaging lens system.

2. The imaging lens of claim 1, wherein the second lens has a meniscus shape having a convex surface facing the image side and the following conditional expression is satisfied:

$$0.90 < r3/r4 < 2.40$$

wherein r3 represents a paraxial curvature radius of a second lens object side surface and r4 represents a paraxial curvature radius of a second lens image side surface.

3. The imaging lens of claim 1, wherein a lens section of the object side surface and a lens section of the image side surface of the first lens are formed of different materials; the lens section of the object side surface of the first lens is a plano-convex lens having a convex surface facing the object side and the lens section of the image side surface of the first lens is a plano-concave lens having a concave surface facing the image side; and the following conditional expression is satisfied:

$$10 < v1 - v2 < 70$$

wherein v1 represents the Abbe number of d line of the lens section of the object side surface of the first lens and v2 represents the Abbe number of d line of the lens section of the image side surface of the first lens.

4. The imaging lens of claim 1, wherein the second lens is made of energy curable resin material.

5. The imaging lens of claim 1, wherein the third lens is provided with a substrate section which is a parallel plate and a lens section formed at least on either of the object side surface and the image side surface of the substrate section.

6. The imaging lens of claim 1, wherein the third lens is a single lens.

7. The imaging lens of claim 1, wherein the substrate section is formed of glass material and the lens section is formed of a resin material.

8. The imaging lens of claim 1, wherein the lens section is formed of an energy curable resin material.

9. An imaging device comprising the imaging lens of claim 1 and a solid-state imaging element to convert an object image having been focused by the imaging lens into an electrical signal.

10. A mobile terminal comprising the imaging device of claim 9.

* * * * *